United States Patent
Fujinaga

(10) Patent No.: US 9,438,316 B2
(45) Date of Patent: Sep. 6, 2016

(54) CONTROL APPARATUS, METHOD AND COMPUTER-READABLE STORAGE MEDIUM

(71) Applicant: CANON KABUSHIKI KAISHA, Tokyo (JP)

(72) Inventor: Seiya Fujinaga, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/332,153

(22) Filed: Jul. 15, 2014

(65) Prior Publication Data

US 2015/0039482 A1 Feb. 5, 2015

(30) Foreign Application Priority Data

Jul. 31, 2013 (JP) ................................ 2013-159716

(51) Int. Cl.
*G06Q 30/04* (2012.01)
*H04B 5/00* (2006.01)
*H02J 5/00* (2016.01)
*H02J 7/02* (2016.01)

(52) U.S. Cl.
CPC ............ *H04B 5/0037* (2013.01); *G06Q 30/04* (2013.01); *H02J 5/005* (2013.01); *H02J 7/025* (2013.01)

(58) Field of Classification Search
CPC ............................. H04B 5/0037; G06Q 30/04
USPC ............................................ 705/34; 307/104
See application file for complete search history.

(56) References Cited

U.S. PATENT DOCUMENTS

| | | | |
|---|---|---|---|
| 7,561,285 B2 | 7/2009 | Fujinaga et al. | |
| 2010/0248622 A1* | 9/2010 | Lyell Kirby | H04B 5/0031 455/41.1 |
| 2012/0290470 A1* | 11/2012 | Lee et al. | 705/39 |
| 2014/0001875 A1* | 1/2014 | Nahidipour | H02J 17/00 307/104 |
| 2014/0361728 A1* | 12/2014 | Qian | H02J 7/025 320/106 |
| 2015/0004914 A1* | 1/2015 | Kusakabe | H04B 5/0037 455/41.3 |
| 2015/0011160 A1* | 1/2015 | Jurgovan | H04B 5/0031 455/41.1 |

FOREIGN PATENT DOCUMENTS

JP 2013-008267 A 1/2013

OTHER PUBLICATIONS

Engadget primed: How wireless and inductive charging works (2011). Engadget [Engadget—BLOG], New York: Newstex. Retrieved from http://search.proquest.com/docview/873564561?accountid=14753.*

* cited by examiner

*Primary Examiner* — Scott Zare

(74) *Attorney, Agent, or Firm* — Fitzpatrick, Cella, Harper & Scinto

(57) ABSTRACT

In the first state in which the position of an external device is included in the first area where a power supply unit executes wireless power supply and is included in the second area wider than the first area where a communication portion performs communication, the power supply unit is controlled to execute wireless power supply. It is determined whether the state of the external device has transited from the first state to the second state in which the position of the external device is included in the second area and is outside the first area. If it is determined that the state has transited from the first state to the second state, information based on the power supply executed in the first state is communicated with the external device via the communication portion.

19 Claims, 19 Drawing Sheets

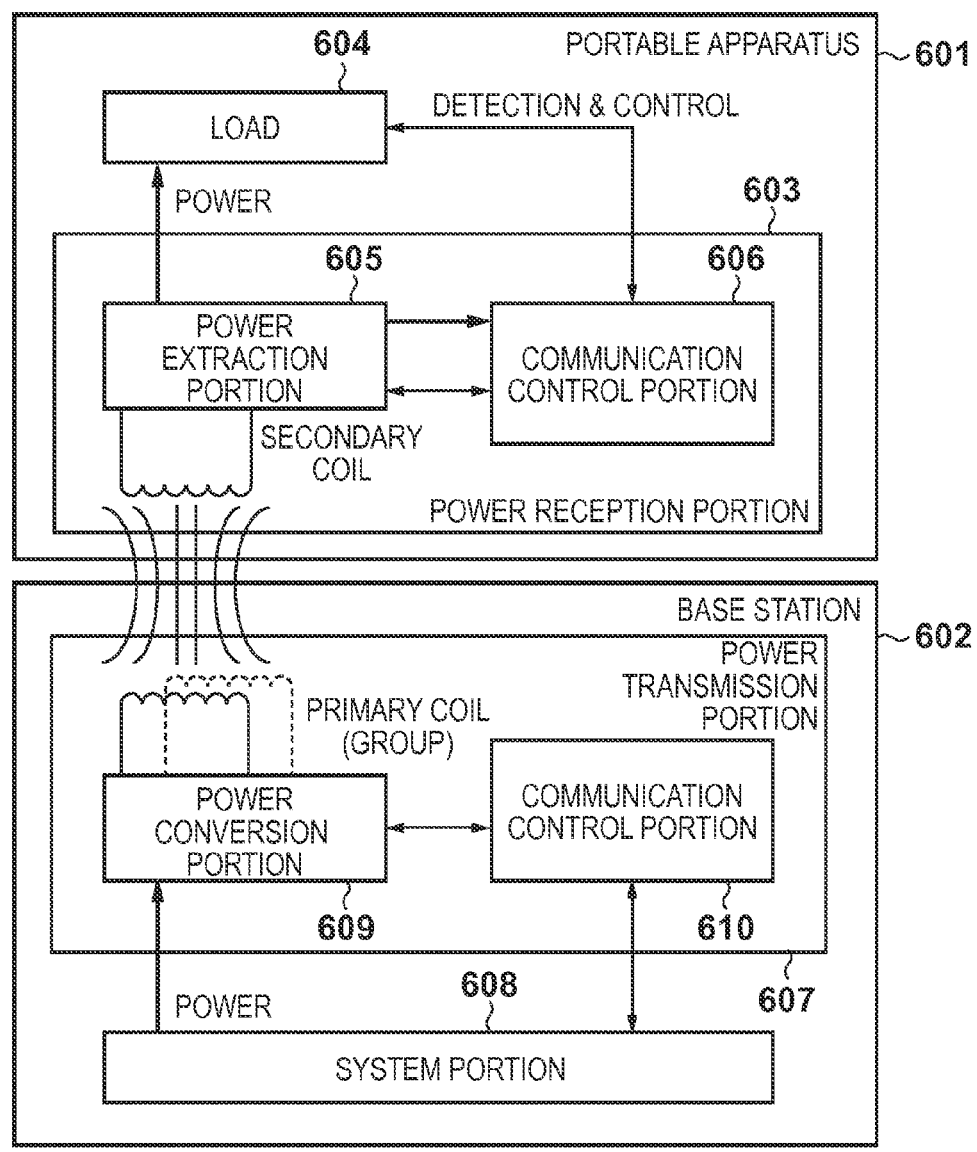

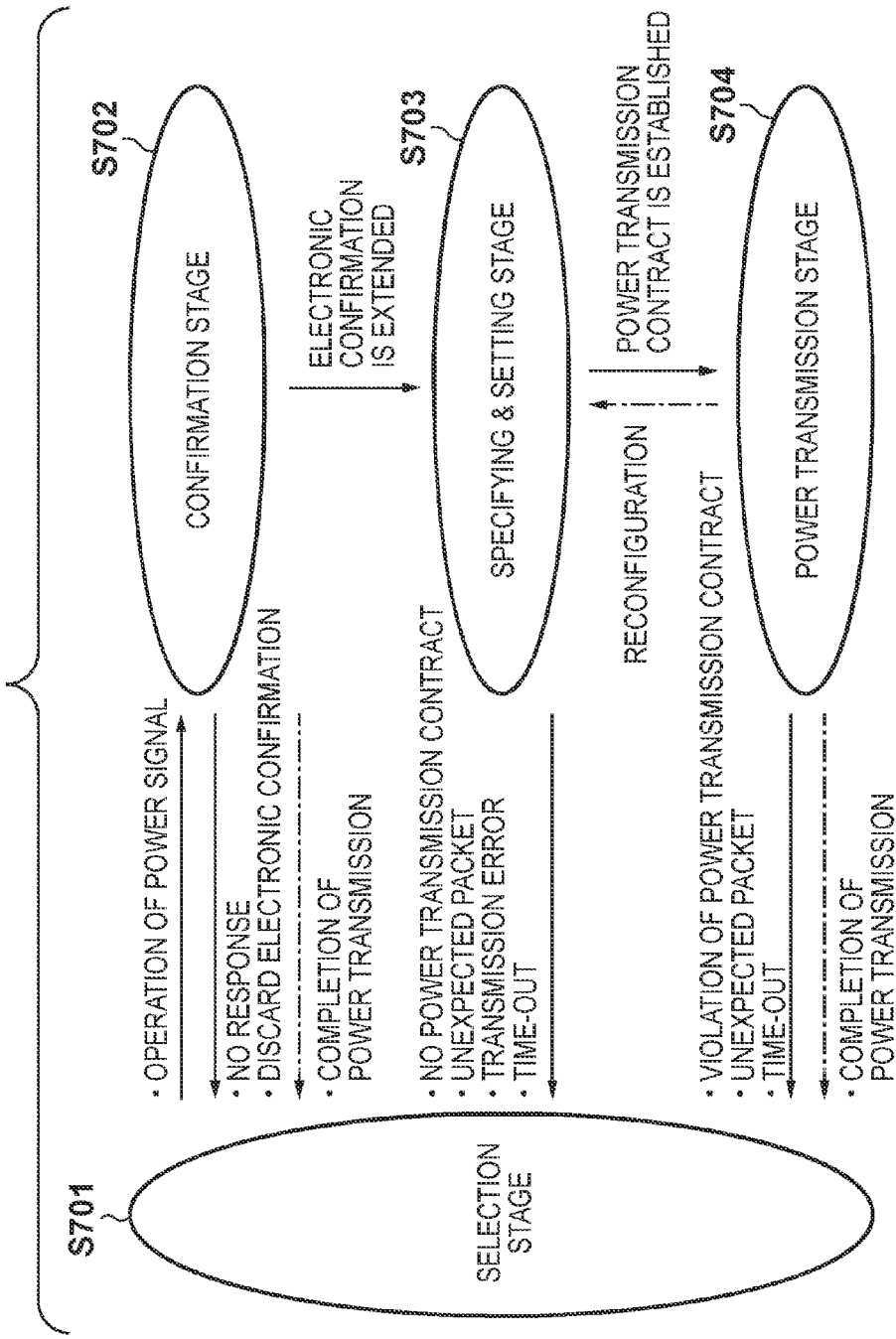

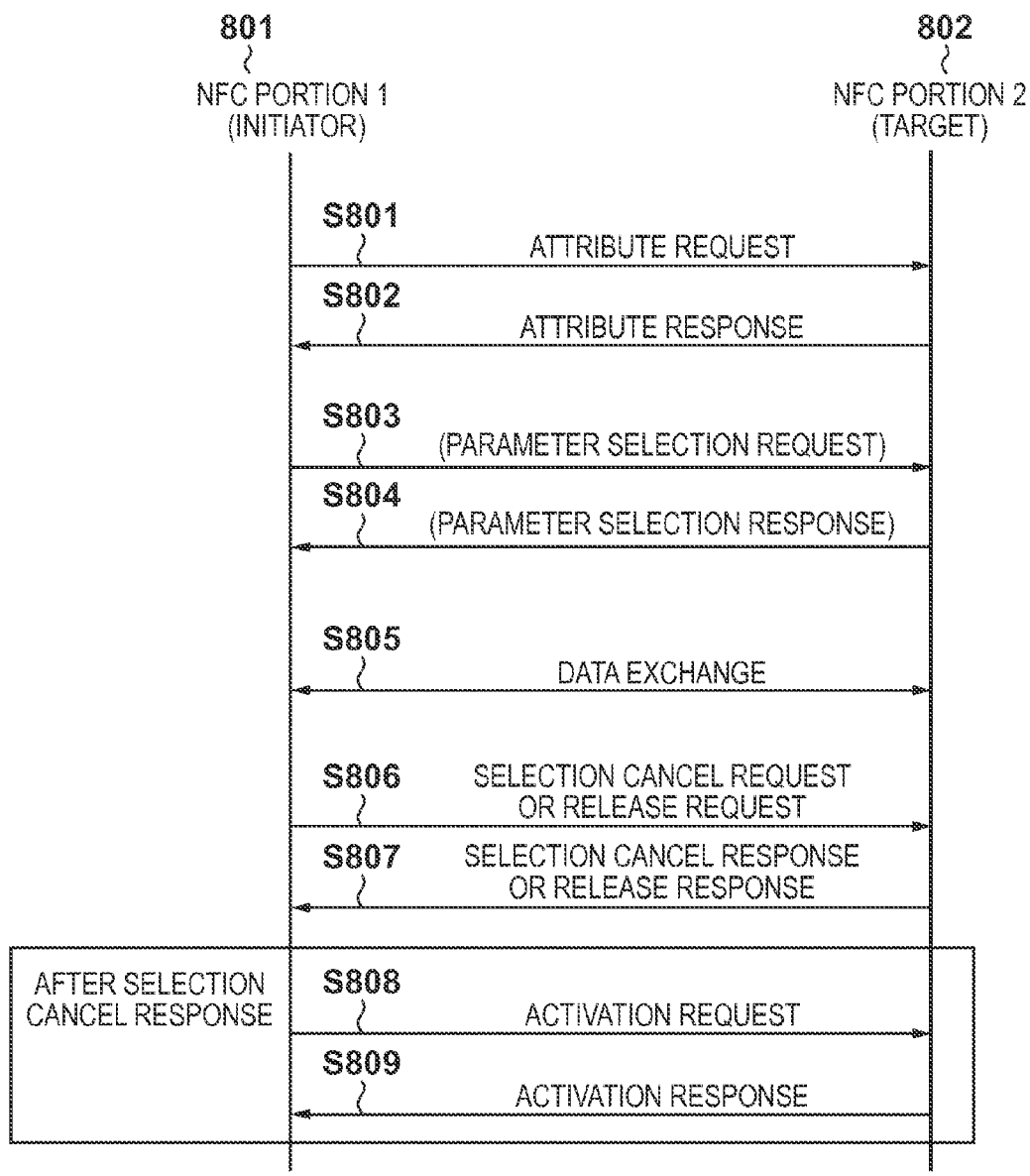

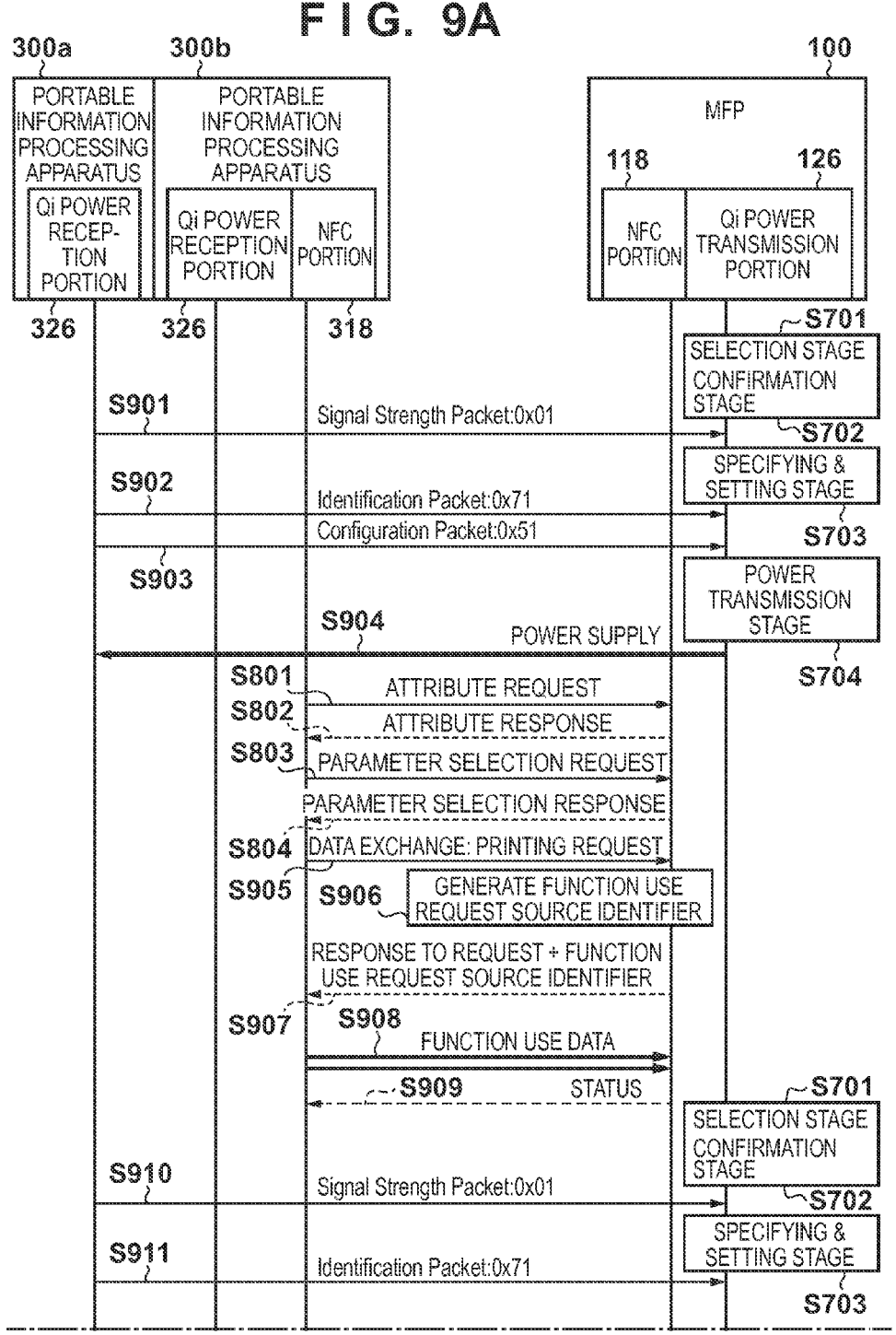

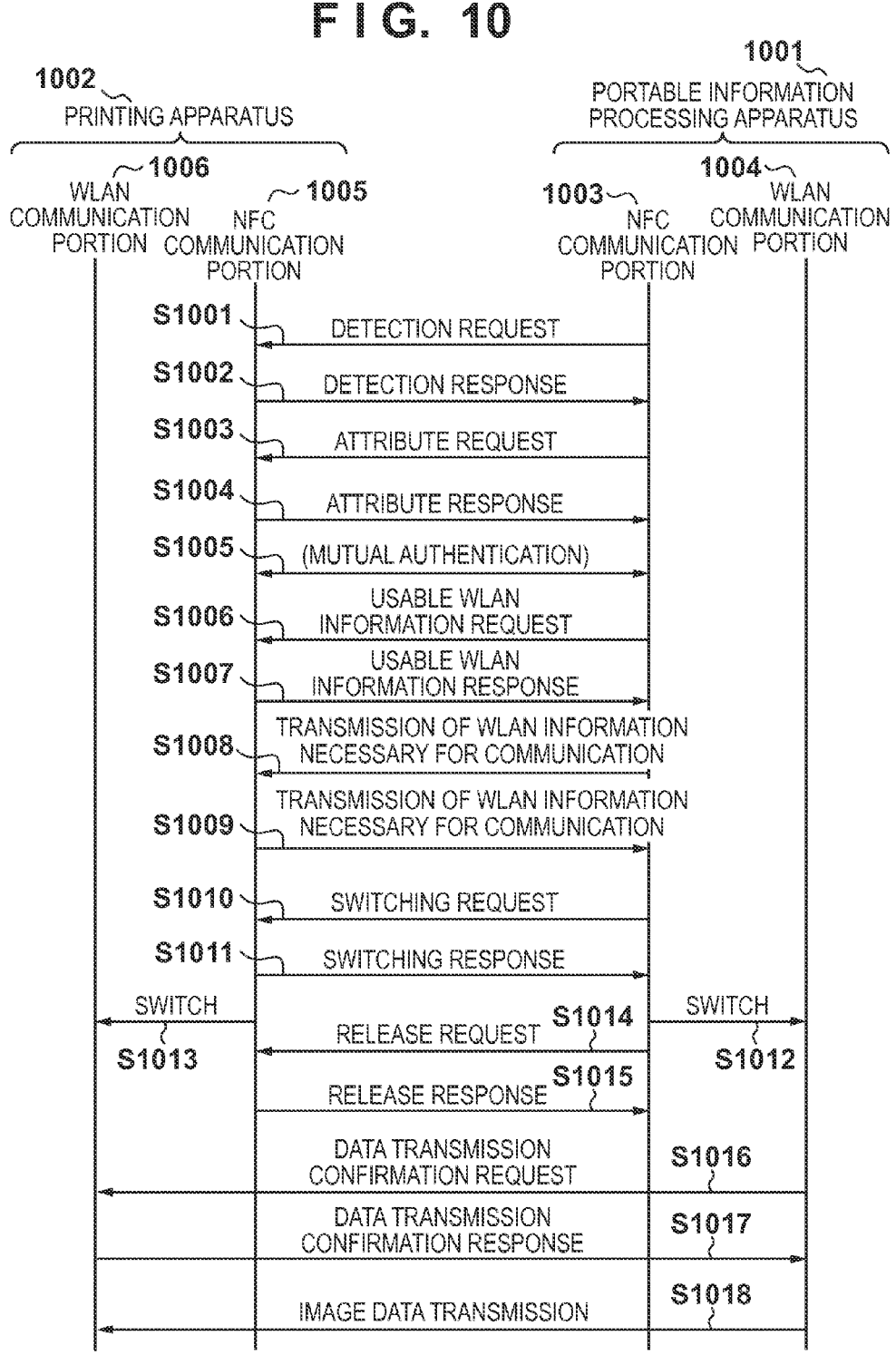

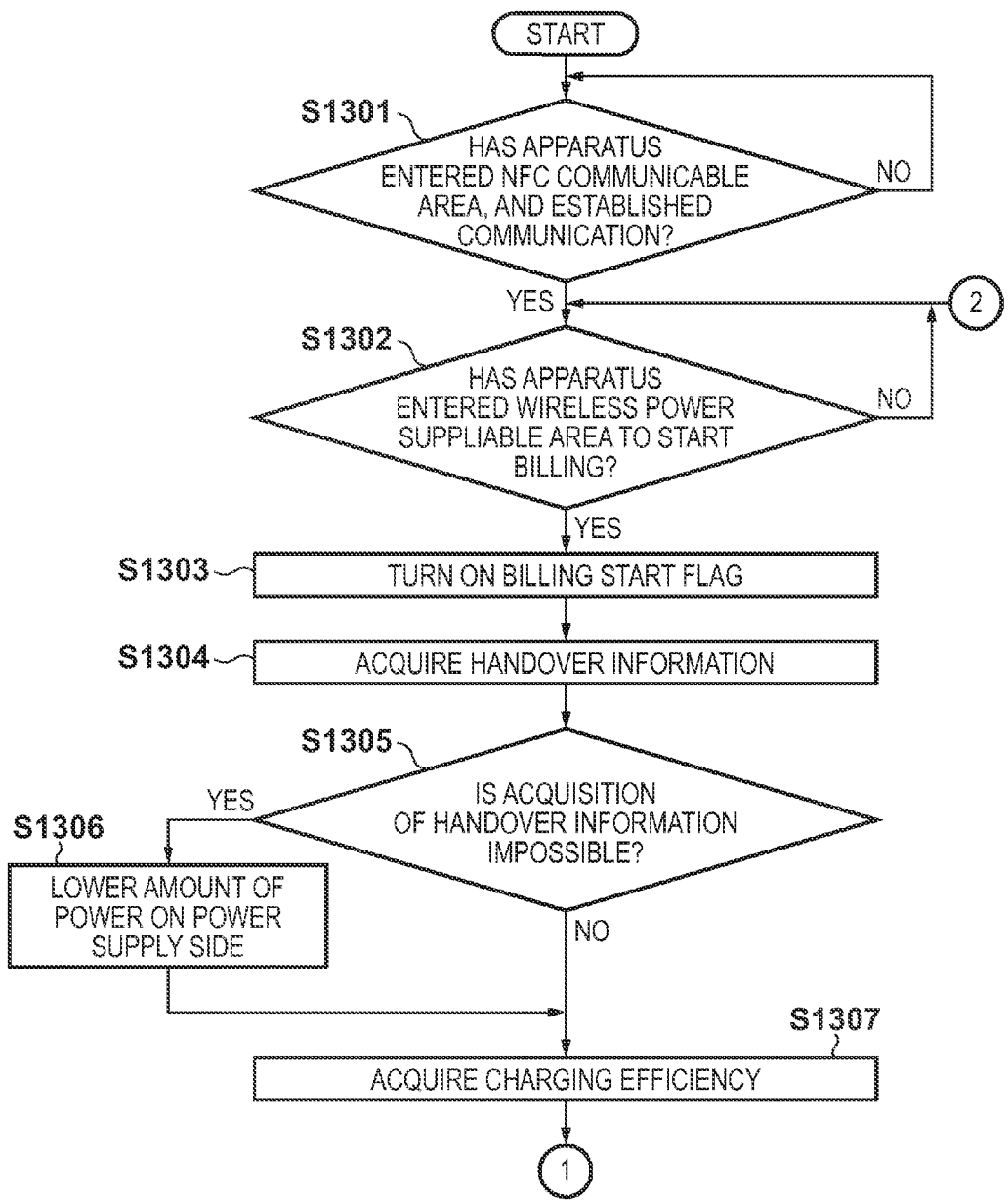
F I G. 13A

CONTROL APPARATUS, METHOD AND COMPUTER-READABLE STORAGE MEDIUM

BACKGROUND OF THE INVENTION

1. Field of the Invention

The present invention relates to a control apparatus, a method, and a computer-readable storage medium.

2. Description of the Related Art

Along with development of recent techniques, a method of performing wireless power supply without directly connecting devices via a cable has been introduced. Billing processing may be performed for charging of the battery of a device as part of a service. As described in Japanese Patent Laid-Open No. 2013-8267, for example, there has been proposed a system in which the amount of charge of a device which has been charged is checked, and billing processing is performed for the amount of charge.

In the above-described conventional technique, however, only when communication for billing for charging is always connected, billing processing is correctly performed.

Furthermore, when billing processing is performed for conventional wired charging, it is performed according to the time. In this case, it is possible to perform billing processing according to the time since the power supply efficiency is ensured. As for wireless charging, however, since the charging efficiency changes depending on the position of a charged apparatus, there is a risk that the amount of charge of the apparatus may not be constant when billing processing is performed according to the time. Consequently, a system in which billing processing is simply performed according to the time is disadvantageous to the user.

In the case of the conventional wired charging, if a charging cable is pulled out, it becomes impossible to grasp information thereafter. It is, therefore, difficult to build a system for performing billing after charging. As a result, a system configuration for performing charging while reliably performing billing is required.

SUMMARY OF THE INVENTION

The present invention provides a technique of allowing appropriate billing and charging.

To achieve the above object, an apparatus according to the present invention has the following arrangement. That is, an apparatus for controlling a power supply unit configured to wirelessly supply power to an external device, and a communication portion capable of wirelessly communicating with the external device, comprising: a control unit configured to control the power supply unit to execute wireless power supply in a first state in which a position of the external device is included in a first area where the power supply unit executes wireless power supply and is included in a second area wider than the first area where the communication portion performs communication; a determination unit configured to determine whether a state of the external device has transited from the first state to a second state in which the position of the external device is included in the second area and is outside the first area; and a communication unit configured to, if the determination unit determines that the state has transited from the first state to the second state, communicate, with the external device via the communication portion, information based on the power supply executed by the control unit in the first state.

According to the present invention, it is possible to appropriately perform billing and charging.

Further features of the present invention will become apparent from the following description of exemplary embodiments with reference to the attached drawings.

BRIEF DESCRIPTION OF THE DRAWINGS

FIG. 6 is a schematic view showing a Qi system configuration;

FIG. 7 is a schematic view showing the 4-stage state transition of Qi;

FIG. 8 is a sequence chart showing a sequence of performing data exchange in an active mode;

FIG. 9A is a sequence chart showing a sequence of commands between the MFP and the portable information processing apparatus;

FIG. 10 is a sequence chart showing a sequence when data transfer is performed by switching between NFC and WLAN;

FIG. 13A is a flowchart illustrating billing processing executed by the MFP for charging of the portable information processing apparatus;

DESCRIPTION OF THE EMBODIMENTS

Embodiments of the present invention will be exemplarily described in detail below with reference to the accompanying drawings. Note that the relative arrangement of components, display screens, and the like set forth in the embodiments do not intend to limit the scope of the invention to them, unless otherwise specified.

This embodiment is implemented using a portable information processing apparatus capable of issuing a printing instruction, and a printing apparatus capable of executing printing. The printing apparatus includes a short distance wireless communication portion (for example, NFC) and a wireless power supply portion (for example, the international standard Qi for wireless charging), and can perform short distance wireless communication with the portable information processing apparatus as an external device, and a charging operation by receiving power from the wireless power supply portion. Furthermore, the printing apparatus has a system configuration which allows billing of the portable information processing apparatus for the charging operation.

Note that this embodiment is implemented by the above arrangement. The present invention, however, is not limited to this as long as the embodiment is implemented using an arrangement which provides the same effects.

Short distance wireless communication indicates wireless communication whose communication range is a relatively narrow predetermined range (for example, 1 m to several cm), which is represented by NFC (Near Field Communication).

An example of the printing apparatus is a multi-function printer (MFP), and an example of the portable information processing apparatus is a smartphone. The smartphone indicates a multi-function mobile phone which incorporates a camera, network browser, email function, and the like in addition to functions of a mobile phone.

Figure 1:
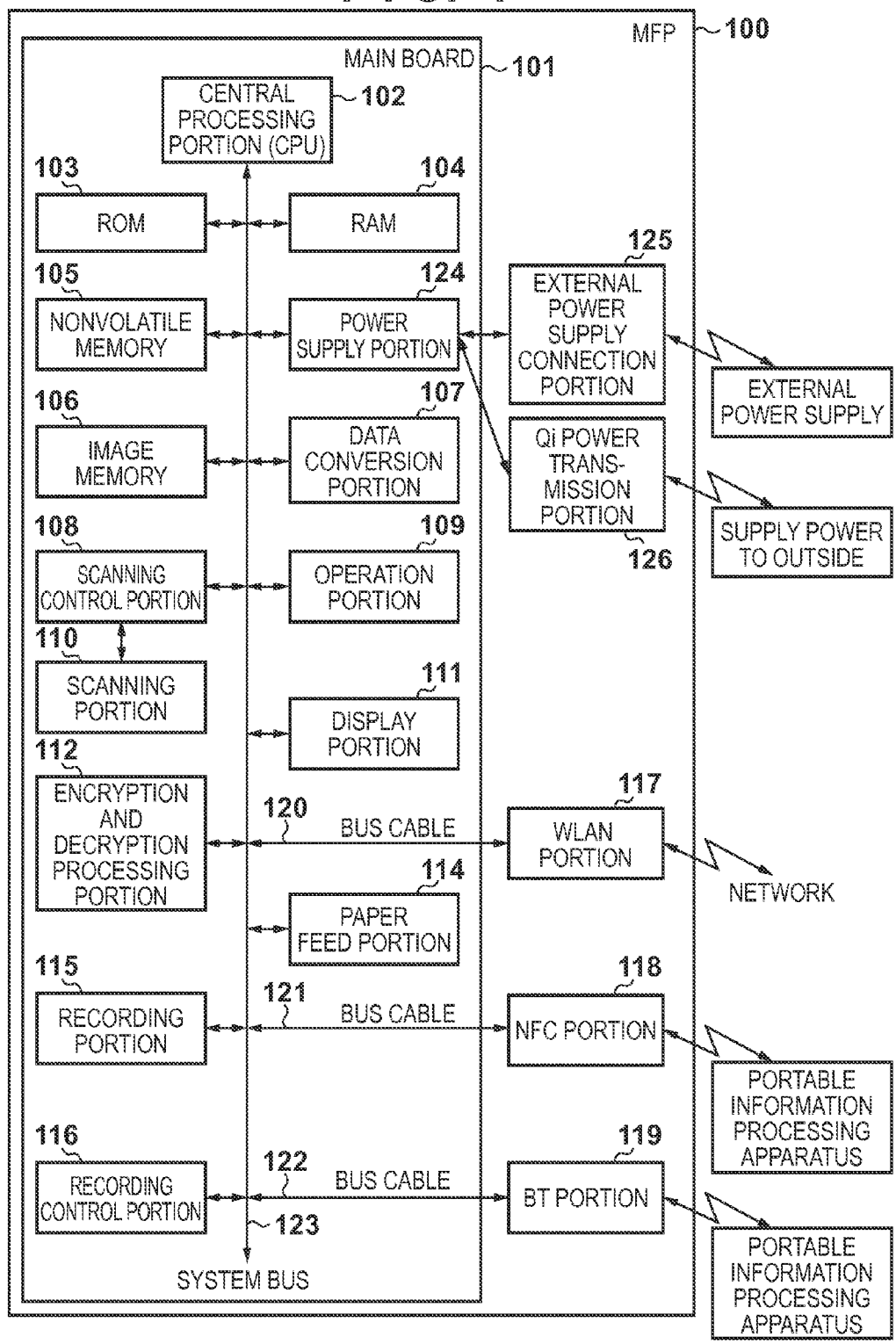
FIG. 1 is a block diagram showing the arrangement of an MFP.

FIG. 1 is a block diagram showing the schematic arrangement of an MFP 100.

The MFP 100 includes a main board 101 for executing main control of the apparatus itself, a WLAN portion 117 for performing WLAN communication, an NFC portion 118 for performing NFC communication, and a BT portion 119 for performing Bluetooth® communication.

In the main board 101, a CPU 102 is a system control portion, and controls the overall MFP 100. A ROM 103 stores control programs to be executed by the CPU 102, an embedded operating system (OS) program, and the like. In this embodiment, the respective control programs stored in the ROM 103 perform software control such as scheduling and task switching under the management of the embedded OS stored in the ROM 103. In this embodiment, the CPU 102 operates as a control apparatus which controls the NFC portion 118 (to be described later) to execute NFC communication, and controls a Qi power transmission portion 126 to supply power to an external apparatus.

A RAM 104 is implemented by an SRAM (Static RAM) or the like, stores data such as program control variables, also stores data such as setting values registered by the user and management data of the MFP 100, and is allocated with various work buffer areas.

A nonvolatile memory 105 is implemented by a memory such as a flash memory, and stores data to be held even after power-off. More specifically, such data include network connection information and user data. An image memory 106 is implemented by a DRAM (Dynamic RAM) or the like, and stores image data received via a communication portion, and those processed by an encryption and decryption processing portion 112. Also, the memory structure is not limited to this, similarly to the memory structure of a portable information processing apparatus 300. A data conversion portion 107 executes analysis of a page description language (PDL) and the like, conversion from image data into print data, and the like.

Note that the communication portion is a general term for communication functions including the WLAN portion 117, NFC portion 118, and BT portion 119.

A scanning control portion 108 controls a scanning portion 110 to optically scan a document by, for example, a CIS image sensor (contact type image sensor). Next, the scanning control portion 108 performs, via an image processing control portion (not shown), various kinds of image processing such as binarization processing and halftone processing for an image signal obtained by converting the scanned document into electrical image data, thereby outputting high-resolution image data.

An operation portion 109 and a display portion 111 correspond to an operation and display portion 205 (FIG. 2). The encryption and decryption processing portion 112 executes encryption/decryption processing and enlargement/reduction processing for image data (JPEG, PNG, or the like) handled by the MFP 100. A paper feed portion 114 holds paper sheets. A paper sheet can be fed from the paper feed portion 114 under the control of a recording control portion 116. Especially, as the paper feed portion 114, a plurality of paper feed portions can be prepared so as to hold a plurality of types of paper sheets in one apparatus. Then, the recording control portion 116 can control to select a paper feed portion to be used to feed paper sheets.

The recording control portion 116 performs, via the image processing control portion (not shown), various kinds of image processing such as smoothing processing, recording density correction processing, and color correction for image data to be printed, and converts the image data into high-resolution image data, thereby outputting the obtained image data to a recording portion 115. The recording control portion 116 also serves to periodically read out information from the recording portion 115, and update information in the RAM 104. More specifically, the recording control portion 116 updates status information such as the remaining amount of an ink tank and a printhead state.

The MFP 100 includes the WLAN portion 117, NFC portion 118, and BT portion 119 as communication portions used to wirelessly communicate with the portable information processing apparatus 300. The WLAN portion 117, NFC portion 118, and BT portion 119 are connected to the main board 101 via bus cables 120, 121, and 122, respectively.

A power supply portion 124 is connected to an external power supply connection portion 125 and the Qi power transmission portion 126, and controls to receive power from the outside via the external power supply connection portion 125, and to supply power to an external Qi power reception portion via the Qi power transmission portion 126.

The respective components 102 to 119 and 124 of the main board 101 are connected to each other via a system bus 123 managed by the CPU 102.

Figure 2A:
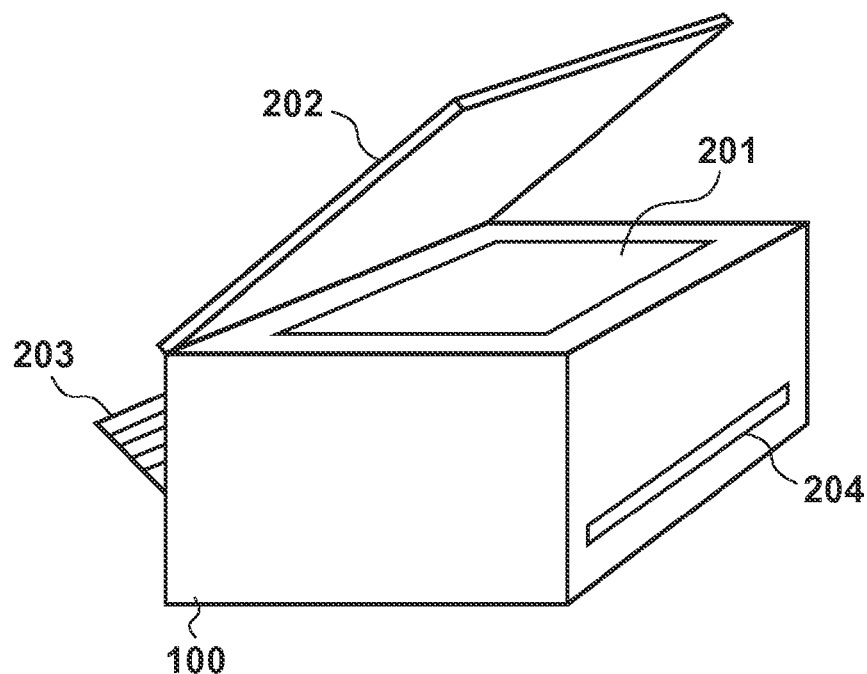
FIG. 2A is a perspective view showing the outer appearance of the MFP.
Figure 2B:
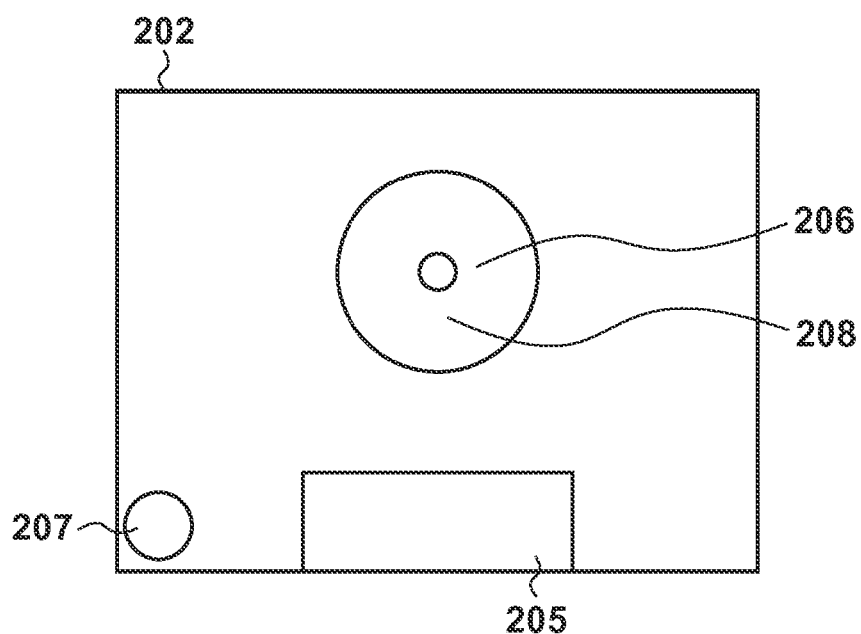
FIG. 2B is a plan view showing the outer appearance of the MFP.

FIGS. 2A and 2B are a perspective view and plan view, respectively, showing the outer appearance of the MFP.

In this embodiment, an MFP (Multi Function Printer) having a scanning function (scanner) will be exemplified. Referring to FIG. 2A, a document table 201 is a glass-like transparent table which is used to scan a document placed on it by the scanner. A document cover 202 is a cover used to prevent scanning light from externally leaking at the time of scanning by the scanner. A printing paper insertion port 203 is an insertion port on which paper sheets of various sizes are set. Paper sheets set on the printing paper insertion port 203 are conveyed one by one to a printing portion, and are discharged from a printing paper discharge port 204 after desired printing is performed.

Referring to FIG. 2B, the operation and display portion 205 and an NFC portion 206 are arranged on the upper portion of the document cover 202. The operation and display portion 205 includes the operation portion 109 and the display portion 111, and can be used to input information using a user interface. The NFC portion 206 is a portion used to perform short distance wireless communication, and is a place where the portable information processing apparatus 300 is actually moved closer to the MFP 100 to contact it. A predetermined distance (about 10 cm) from the NFC portion 206 is an effective distance of contact. A WLAN antenna 207 is an antenna which is used to perform WLAN communication, and is embedded in the MFP. A Qi power transmission portion 208 is a portion used to supply power according to the international standard Qi, and is arranged near the NFC portion 206.

Figure 3:
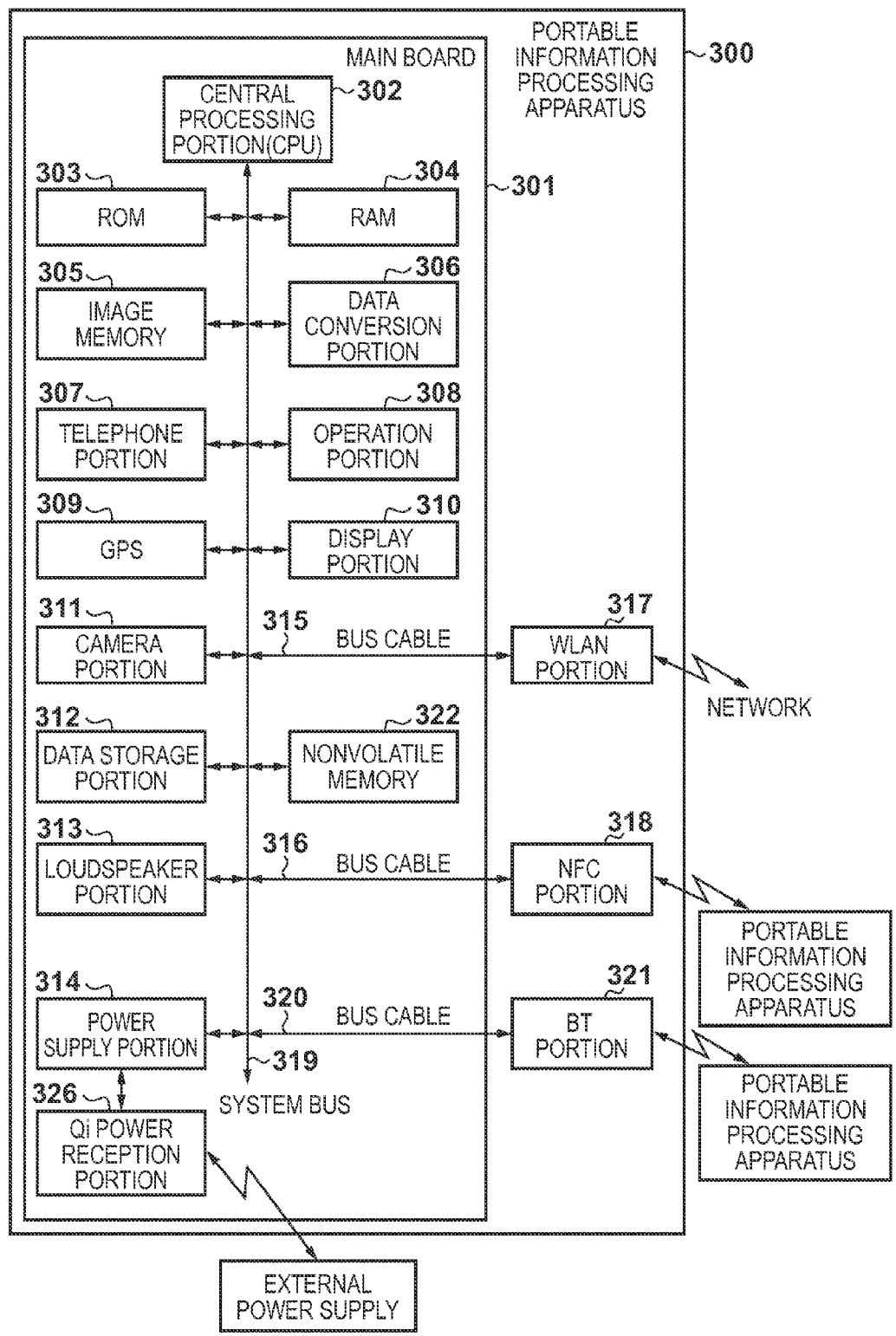
FIG. 3 is a block diagram showing the arrangement of a portable information processing apparatus.

FIG. 3 is a block diagram showing the arrangement of the portable information processing apparatus 300.

The portable information processing apparatus 300 includes a main board 301 for executing main control of the apparatus, a WLAN portion 317 for performing WLAN communication, an NFC portion 318 for performing NFC communication, and a BT portion 321 for performing Bluetooth® communication.

In the main board 301, a CPU 302 is a system control portion, and controls the overall portable information processing apparatus 300. A ROM 303 stores control programs to be executed by the CPU 302, an embedded operating system (OS) program, and the like. In this embodiment, the respective control programs stored in the ROM 303 execute software control such as scheduling and task switching under the management of the embedded OS stored in the ROM 303.

A RAM 304 is implemented by an SRAM (Static RAM) or the like, stores data such as program control variables, also stores data such as setting values registered by the user and management data of the portable information processing apparatus 300, and is allocated with various work buffer areas.

An image memory 305 is implemented by a memory such as a DRAM (Dynamic RAM), and temporarily stores image data received via a communication portion and those read out from a data storage portion 312 so as to be processed by the CPU 302. Note that the communication portion is a general term for communication functions including the WLAN portion 317, NFC portion 318, and BT portion 321.

A nonvolatile memory 322 is implemented by a memory such as a flash memory, and stores data to be saved even after power-off. Such data include, for example, an address book, mail history, incoming/outgoing call history, and information about devices connected in the past. Note that the memory structure is not limited to this. For example, the image memory 305 and the RAM 304 may share a memory, or data may be backed up in the data storage portion 312. In this embodiment, a DRAM is used as the image memory 305. However, the present invention is not limited to this since another storage medium such as a hard disk or a nonvolatile memory may be used.

A data conversion portion 306 executes analysis of a page description language (PDL) and the like, and data conversion such as color conversion and image conversion. A telephone portion 307 controls a telephone line, and implements telephone communication by processing audio data input/output via a loudspeaker portion 313. An operation portion 308 includes a touch-panel operation mechanism, and detects pressing information of the user. A GPS (Global Positioning System) 309 acquires position information such as the current latitude and longitude. A display portion 310 electronically controls display contents, allows various input operations, and can display operation states, status conditions, and the like of the MFP 100.

A camera portion 311 has a function of electronically recording and encrypting an image input via a lens. An image captured by the camera portion 311 is saved in the data storage portion 312. The loudspeaker portion 313 implements a function of inputting or outputting a speech for a telephone function, and also an alarm notification function and the like. A power supply unit 314 incorporates a Qi power reception portion 326 serving as a connection portion between a portable battery and an external power supply, which connects to the battery or external power supply and controls the connection. A power supply state includes a battery dead state in which the battery has no remaining amount, a power-off state in which the operation and display portion 205 is not pressed, an activation state in which the apparatus is normally active, and a power saving state in which the apparatus is active but is set in a power saving mode. The portable information processing apparatus 300 uses the Qi power reception portion 326 to implement wireless charging from the external power supply.

The portable information processing apparatus 300 incorporates three communication portions used to perform wireless communication, and can perform wireless communication by WLAN, NFC, and Bluetooth®. Thus, the portable information processing apparatus 300 performs data communication with another device such as an MFP. Each communication portion converts data into packets, and transmits the packets to the other device. Conversely, each communication portion converts packets coming from another external device into data, and transmits the data to the CPU 302. The WLAN portion 317, NFC portion 318, and BT portion 321 are connected to the main board 301 via bus cables 315, 316, and 320, respectively. The WLAN portion 317, NFC portion 318, and BT portion 321 are portions each used to attain communication complying with its standard.

The respective components 303 to 314, 317, 318, 321, and 322 of the main board 301 are connected to each other via a system bus 319 managed by the CPU 302.

Figure 4:
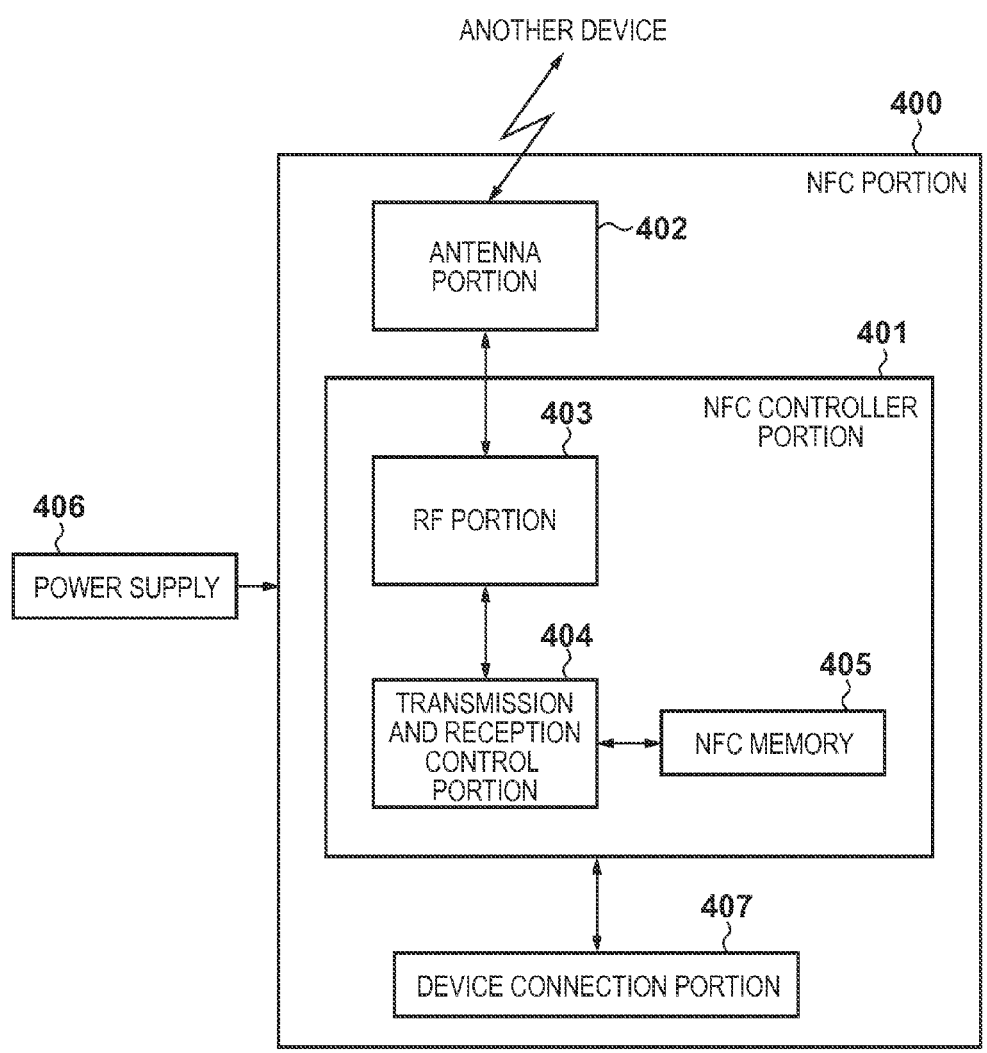
FIG. 4 is a block diagram showing the detailed arrangement of an NFC portion.

FIG. 4 is a block diagram showing details of an NFC portion used as the NFC portion 118 or 318.

The NFC portion 118 (FIG. 1) or NFC portion 318 (FIG. 3) will be described as an NFC portion 400 with reference to FIG. 4. The NFC portion 400 includes an NFC controller portion 401, an antenna portion 402, an RF portion 403, a transmission and reception control portion 404, an NFC memory 405, a power supply 406, and a device connection portion 407.

The antenna portion 402 receives radio waves and carriers from another NFC device (a device incorporating an NFC portion), and transmits radio waves and carriers to another NFC device. The RF portion 403 has a function of modulating/demodulating an analog signal to a digital signal. The RF portion 403 includes a synthesizer, and controls bands and channels based on frequency assignment data by identifying the frequencies of the bands and channels.

The transmission and reception control portion 404 executes control associated with transmission/reception, such as assembling and disassembling of a transmission/reception frame, appending and detection of a preamble, and identification of a frame. The transmission and reception control portion 404 also controls the NFC memory 405 to read/write various data and programs. When the NFC portion operates in the active mode in NFC communication, it receives power via the power supply 406 to communicate with an NFC device via the device connection portion 407 and to communicate with another NFC device located within a communicable range by carriers transmitted/received via the antenna portion 402. When the NFC portion operates in the passive mode in NFC communication, it receives carriers from another NFC device via the antenna portion 402 to receive power from the other NFC device by electromagnetic induction, and transmits/receives data by performing communication with the other NFC device by modulating carriers.

NFC communication will now be described. An apparatus which starts communication by outputting an RF (Radio Frequency) field when performing communication by an NFC portion will be referred to as an initiator. An apparatus which communicates with the initiator in response to an instruction issued by the initiator will be referred to as a target.

The communication mode of the NFC portion includes a passive mode and active mode. In the passive mode, a target responds to an instruction of an initiator by performing load modulation. On the other hand, in the active mode, the target responds to an instruction of the initiator by an RF field generated by the target itself.

Figure 5:
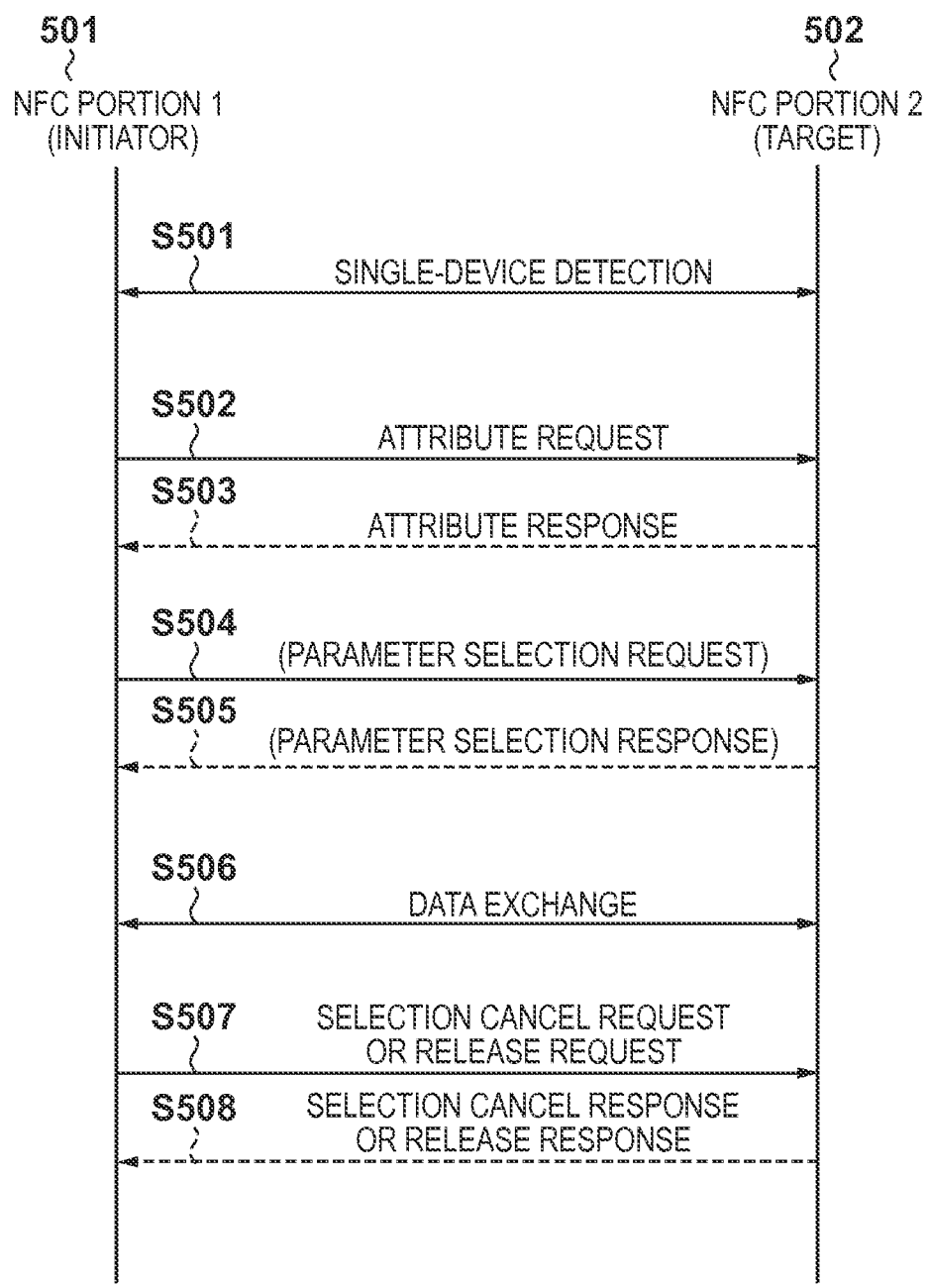
FIG. 5 is a sequence chart showing a sequence of performing data exchange in a passive mode.

FIG. 5 is a sequence chart showing a sequence of performing data exchange in the passive mode.

A case will now be described in which a first NFC portion 501 operates as an initiator, and a second NFC portion 502 operates as a target.

In step S501, the first NFC portion 501 performs single-device detection and specifies the second NFC portion 502. In step S502, the first NFC portion 501 transmits the identifier of its own, the bit transmission rate of transmission/reception, the effective data length, and the like as an attribute request. The attribute request has general purpose bytes which can be arbitrarily selected and used.

Upon receiving an effective attribute request, the second NFC portion 502 transmits an attribute response in step S503. Transmission from the second NFC portion 502 is done by load modulation. Data transmission by load modulation is represented by a dotted arrow in FIG. 5.

Note that in data transmission by load modulation, the NFC portion serving as a target transmits data using, as a power supply, a current flowing through the NFC portion by an RF field generated by an initiator. That is, the NFC portion serving as a target in the passive mode can transmit data to the NFC portion serving as an initiator even if no power is supplied from the AC power supply, the battery, or the like.

After confirming an effective attribute response, the first NFC portion 501 can change the parameters of the subsequent transmission protocol by transmitting a parameter selection request in step S504. Parameters included in the parameter selection request are the transmission rate and the effective data length.

Upon receiving an effective parameter selection request, the second NFC portion 502 transmits a parameter selection response in step S505, thereby changing the parameters. Note that steps S504 and S505 may be omitted if the parameter change is not to be performed.

In step S506, the first NFC portion 501 and the second NFC portion 502 exchange data by a data exchange request and a data exchange response. At the time of transmitting the data exchange request and the data exchange response, information for an application of the communication partner or the like can be transmitted as data. If the data size is large, the data can be divisionally transmitted.

Upon completion of data exchange, the first NFC portion 501 transmits one of a selection cancel request and a release request in step S507.

When the first NFC portion 501 transmits the selection cancel request, the second NFC portion 502 transmits a selection cancel response in step S508. Upon receiving the selection cancel response, the first NFC portion 501 releases the attributes representing the second NFC portion 502, and the process returns to step S501.

On the other hand, when the first NFC portion 501 transmits the release request, the second NFC portion 502 transmits a release response in step S508, thereby returning to the initial state. Upon receiving the release response, the first NFC portion 501 may return to the initial state because the target is completely released.

FIG. 6 is a schematic view showing a Qi system configuration.

The system includes a portable apparatus 601 for receiving power using an electromagnetic induction mechanism, and a base station 602 for transmitting power. For example, the above-described portable information processing apparatus 300 operates as the portable apparatus 601, and the above-described MFP 100 operates as the base station 602.

The portable apparatus 601 includes a power reception portion 603 for receiving power according to Qi, and a load 604. The power reception portion 603 includes a power extraction portion 605 for extracting power from a secondary coil connected to itself, and a communication control portion 606 for performing various control operations.

The base station 602 includes a power transmission portion 607 for transmitting power according to Qi, and a system portion 608. The power transmission portion 607 includes a power conversion portion 609 for supplying power to a primary coil connected to itself, and a communication control portion 610 for performing various control operations. The primary coil connected to the power transmission portion 607 may move according to the position of the power reception portion 603. Alternatively, a plurality of coils may be included and it may be controlled to supply power to only a coil near the position of the power reception portion 603. These control operations are implemented by programs stored in the communication control portion 610.

The schematic view shown in FIG. 6 is applied to FIGS. 1 and 3 in this embodiment. The portable apparatus 601 corresponds to the portable information processing apparatus 300, the power reception portion 603 corresponds to the Qi power reception portion 326, and the load 604 is a general term for respective portions requiring power and shown in FIG. 3. Furthermore, the base station 602 corresponds to the MFP 100, the power transmission portion 607 corresponds to the Qi power transmission portion 126, and the system portion 608 is a general term for other portions shown in FIG. 1.

FIG. 7 is a schematic view showing the 4-stage state transition of Qi.

Power supply from the power transmission portion 607 to the power reception portion 603 includes four states, that is, a selection stage S701, confirmation stage S702, specifying & setting stage S703, and power transmission stage S704. A solid arrow indicates transition of the power transmission portion 607, and a one-dot dashed arrow indicates transition of the power reception portion 603. When the power reception portion 603 is not compatible with a power signal or the power transmission portion 607 stops issuing power signals, the state transits from any of other stages to the selection stage S701. The main behavior in each stage will be explained below.

In the selection stage S701, the power transmission portion 607 monitors whether the power reception portion 603 enters or leaves a communication range. Upon detecting the power reception portion 603, the power transmission portion 607 attempts to specify the location of the power reception portion 603, as needed, thereby deciding a power transmission target. There are many methods of using the selection stage S701, and it is possible to return to the selection stage S701 to detect a new power reception portion 603 even during charging. In this stage, the power transmission portion 607 does not have enough information of the power reception portion 603, and transits to the confirmation stage S702 by operating a power signal.

In the confirmation stage S702, the power transmission portion 607 executes electronic confirmation, and detects a response to it. The electronic confirmation indicates an operation of an electronic signal for specifying the power reception portion 603. Upon discovering the power reception portion 603, the power transmission portion 607 extends the electronic confirmation to transit to the specifying & setting stage S703. If the power transmission portion 607 does not extend the electronic confirmation, it returns to the selection stage S701.

In the specifying & setting stage S703, the power transmission portion 607 specifies the selected power reception portion 603, and acquires arrangement information (largest required power and the like) of the power reception portion 603. The power transmission portion 607 generates a power transmission contract using the arrangement information of the power reception portion 603. The power transmission contract includes limitations of parameters characterizing the power transmission stage S704. When the power transmission contract is established, the power transmission portion 607 transits to the power transmission stage S704. Before that, however, the power transmission portion 607 can transit to the selection stage S701 by stopping extending the electronic confirmation.

In the power transmission stage S704, the power transmission portion 607 adjusts the current of the primary coil based on control information acquired from the power reception portion 603, and continues transmitting power to the power reception portion 603. The power transmission portion 607 monitors whether the limitations of the power transmission contract is violated. If the contract is violated, the power transmission portion 607 stops transmitting power, and transits to the selection stage S701. It is also possible to stop transmitting power in response to a request from the power reception portion 603 for which charging is complete, or generate a power transmission contract again by transiting to the specifying & setting stage S703 to shift to a trickle charge.

FIG. 8 is a sequence chart showing a sequence of performing data exchange in the active mode by NFC.

A case will now be described in which a first NFC portion 801 operates as an initiator, and a second NFC portion 802 operates as a target.

In step S801, the first NFC portion 801 transmits the identifier of its own, the bit transmission rate of transmission/reception, the effective data length, and the like as an attribute request.

Upon receiving an effective attribute request, the second NFC portion 802 transmits an attribute response in step S802. Transmission from the second NFC portion 802 is done by an RF field generated by itself. For this reason, the first NFC portion 801 and the second NFC portion 802 stop outputting the RF fields upon completion of data transmission.

After confirming an effective attribute response, the first NFC portion 801 can change the parameters of the transmission protocol by transmitting a parameter selection request in step S803. Parameters included in the parameter selection request are the transmission rate and the effective data length.

Upon receiving an effective parameter selection request, the second NFC portion 802 transmits a parameter selection response in step S804, thereby changing the parameters. Note that steps S803 and S804 may be omitted if the parameter change is not to be performed, as in the passive mode.

In step S805, the first NFC portion 801 and the second NFC portion 802 exchange data by a data exchange request and a data exchange response. At the time of transmitting the data exchange request and the data exchange response, information for an application or the like can be transmitted as data. If the data size is large, the data can be divisionally transmitted.

Upon completion of data exchange, the first NFC portion 801 transmits one of a selection cancel request and a release request in step S806.

When the first NFC portion 801 transmits the selection cancel request, the second NFC portion 802 transmits a selection cancel response in step S807. Upon receiving the selection cancel response, the first NFC portion 801 releases the attributes representing the second NFC portion 802. After that, in step S808, the first NFC portion 801 transmits an activation request to another target whose identifier is known. Upon receiving the activation request, the target transmits an activation response in step S809, and the process returns to step S801.

On the other hand, when the first NFC portion 801 transmits the release request, the second NFC portion 802 transmits a release response in step S808, thereby returning to the initial state. Upon receiving the release response, the first NFC portion 801 may return to the initial state because the target is completely released.

Figure 9B:
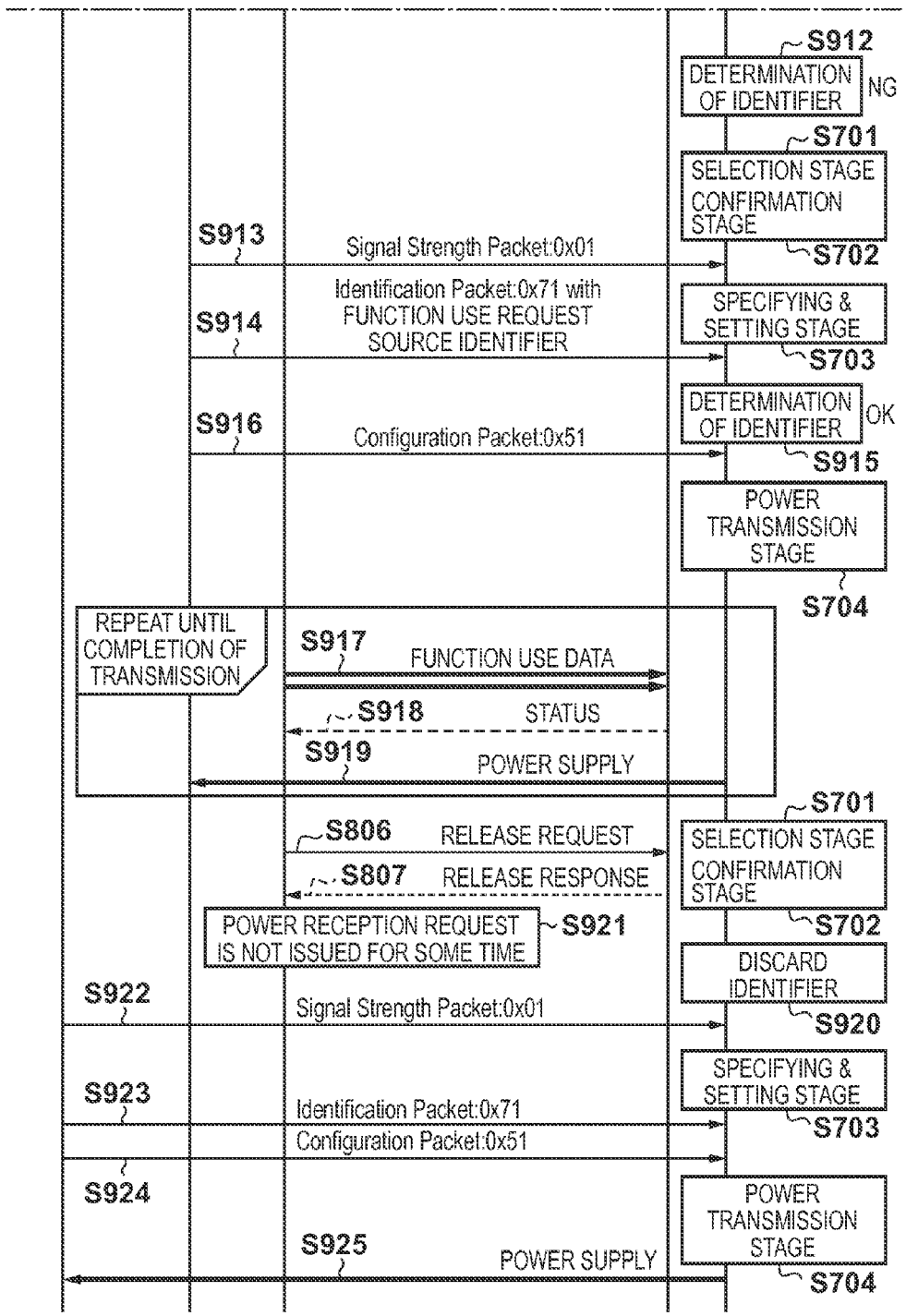
FIG. 9B is a sequence chart showing a sequence of commands between the MFP and the portable information processing apparatus.

FIGS. 9A and 9B are a sequence chart showing transmission and reception of commands between the MFP 100 and portable information processing apparatus 300. The same processes as those shown in FIGS. 7 and 8 have the same reference symbols and the following description will be made. Note that the processing shown in FIGS. 9A and 9B is implemented when the CPU 102 of the MFP 100 controls the NFC portion 118 and Qi power transmission portion 126 of the MFP 100, and the CPU 302 of the portable information processing apparatus 300 controls the NFC portion 318 and Qi power reception portion 326. More specifically, programs for implementing processes by the MFP 100 and portable information processing apparatus 300 (300a and 300b), which are shown in FIGS. 9A and 9B, are stored in the ROM 103 of the MFP 100 and the ROM 303 of the portable information processing apparatus 300. The processing shown in FIGS. 9A and 9B are implemented when the CPU 102 of the MFP 100 and the CPU 302 of the portable information processing apparatus 300 execute the programs in the RAMs 104 and 304, respectively.

The portable information processing apparatus 300a incorporates a Qi power reception portion, the portable information processing apparatus 300b incorporates a Qi power reception portion and NFC initiator, and the MFP 100 incorporates a Qi power transmission portion and NFC target. In the following description, processing associated with wireless charging is performed between the Qi power reception portion (Qi power reception portion 326) and the Qi power transmission portion (Qi power transmission portion 126).

A system in which the portable information processing apparatus 300a receives power from the MFP 100 will be described first.

In step S901, the MFP 100 in the selection stage S701 transits to the confirmation stage S702 in response to an operation of a power signal from the portable information processing apparatus 300a installed nearby. The portable information processing apparatus 300a desires to receive power, and thus notifies the MFP 100 of a Signal Strength packet. The Signal Strength packet functions as a power request to request power supply (power reception). Upon receiving the Signal Strength packet, the MFP 100 transits to the specifying & setting stage S703.

In step S902, the portable information processing apparatus 300a notifies the MFP 100 of an Identification packet according to the wireless charging standard Qi. By using the Identification packet, the portable information processing apparatus 300a can notify the MFP 100 of Basic Device Identifier formed by a character string of 20 bits to 31 bits. Basic Device Identifier functions as the identifier (power request source identifier) of the device which requests power supply (power reception).

In step S903, the portable information processing apparatus 300a notifies the MFP 100 of a Configuration packet. In the Configuration packet, the portable information processing apparatus 300a designates Power Class and the like which are defined by Qi, and defines an amount of power to be received.

Upon receiving the Identification packet and the Configuration packet, the MFP 100 transits to the power transmission stage S704. In step S904, the MFP 100 transmits (supplies) power to the portable information processing apparatus 300a in accordance with the pieces of information defined in the received packets.

A case will be described in which the portable information processing apparatus 300b preferentially receives power by executing printing for the MFP 100 under the above-described situation.

Steps S801 to S804 are the same as those of FIG. 8. As a result, the NFC portion 318 of the portable information processing apparatus 300b serves as an initiator, and thus data exchange with the MFP 100 becomes possible.

In step S905, the NFC portion 318 of the portable information processing apparatus 300b transmits a printing request to the MFP 100.

When the NFC portion 118 receives the printing request, in step S906 the MFP 100 generates a function use request source identifier for identifying the portable information processing apparatus 300b as a printing request source (function request source). The function use request source identifier is formed by a 20-bit character string complying with Basic Device Identifier included in the Identification packet. The MFP 100 on the reception side needs to ensure that the identifier has a unique value. Note that the above-described function use request source identifier is an identifier generated by the CPU 102 on the RAM 104.

In step S907, the MFP 100 uses the NFC portion 118 to notify the portable information processing apparatus 300b of the function use request source identifier together with a response indicating printing permission. The function use request source identifier also indicates that power supply is possible. When the portable information processing apparatus 300b is notified of the function use request source identifier, it can use the function use request source identifier as a power request source identifier to request power reception.

Upon receiving the response indicating printing permission, the portable information processing apparatus 300b starts to transfer print data as function use data to the MFP 100 in step S908.

In step S909, the MFP 100 periodically notifies the portable information processing apparatus 300b of the status of the print data. The contents of the status include a remaining ink amount, a currently processed page count, or information of an error which has occurred. At the same time, the MFP 100 detects that a function other than a power transmission function has been used, and interrupts the power transmission function by transiting from the power transmission stage S704 to the selection stage S701. After that, the MFP 100 operates Power Signal to transit to the confirmation stage S702.

Upon detecting that power reception has been interrupted, the portable information processing apparatus 300a notifies the MFP 100 of a Signal Strength packet in step S910, as in step S901. Upon receiving the Signal Strength packet, the MFP 100 transits to the specifying & setting stage S703.

As in step S902, the portable information processing apparatus 300a notifies the MFP 100 of an Identification packet in step S911.

Upon receiving the Identification packet, the MFP 100 confirms in step S912 whether Basic Device Identifier indicated in the packet coincides with the function use request source identifier generated in step S906. More specifically, the CPU 102 of the MFP 100 compares the function use request source identifier generated on the RAM 104 in response to the printing request received by the NFC portion 118 from the portable information processing apparatus 300b with the power request source identifier received by the communication control portion of the Qi power transmission portion 126. If the identifiers coincide with each other, it can be determined that the apparatus which has requested power reception is an apparatus which is performing communication by NFC.

In this embodiment, when the Qi power transmission portion 126 of the MFP 100 receives an NFC communication request, it transmits power to an apparatus which has requested power reception under the condition that the apparatus is an apparatus which performs NFC communication.

In step S912, the portable information processing apparatus 300a has not received the function use request source identifier of the portable information processing apparatus 300b, which has been generated in step S906. Consequently, the power request source identifier transmitted by the portable information processing apparatus 300a is different from the function use request source identifier of the portable information processing apparatus 300b, which has been generated in step S906. Therefore, the identifiers do not coincide with each other in step S912. That is, it is determined that the apparatus which has requested power reception is different from the apparatus which performs NFC communication. To reset a series of processes toward the power transmission stage S704, the MFP 100 transits from the power transmission stage S704 to the selection stage S701, and continuously transits to the confirmation stage S702 by operating Power Signal. As a result, even if a Configuration packet is received from the portable information processing apparatus 300a after that, the MFP 100 does not transit to the power transmission stage S704, and the portable information processing apparatus 300*a* cannot receive power from the MFP 100, thereby repeating steps S910 and S911.

As in step S901, the portable information processing apparatus 300*b* notifies the MFP 100 of a Signal Strength packet in step S913. Upon receiving the Signal Strength packet, the MFP 100 transits to the specifying & setting stage S703.

As in step S902, the portable information processing apparatus 300*b* notifies the MFP 100 of an Identification packet as a power request source identifier in step S914. At this time, the function use request source identifier sent in step S907 is described as Basic Device Identifier.

As in step S912, the MFP 100 confirms in step S915 whether Basic Device Identifier serving as a power request coincides with the function use request source identifier generated in step S906. In this case, the function use request source identifier received by the portable information processing apparatus 300*b* in step S907 is used as a power request source identifier, as described above. Therefore, the identifiers coincide with each other in step S915. That is, it is determined that the apparatus which has requested power reception is the same as the apparatus which performs NFC communication. It can thus be determined that the apparatus which has requested power reception in steps S913 and S914 requires power for NFC communication. Therefore, the MFP 100 continues the series of processes toward the power transmission stage S704 in order to transmit power to the apparatus which has requested power reception in steps S910 and S911.

As in step S903, the portable information processing apparatus 300*b* notifies the MFP 100 of a Configuration packet in step S916. Upon receiving the Identification packet and Configuration packet, the MFP 100 transits to the power transmission stage S704.

In step S917, the portable information processing apparatus 300*b* continues the processing in step S908. In FIG. 9B, this processing is performed after step S916. However, the processing in step S908 actually continues, since communication is performed between the NFC portions 318 and 118.

In step S918, the MFP 100 continues the status response processing in step S909.

As a result of transiting to the power transmission stage S704 via step S916, the MFP 100 transmits power to the portable information processing apparatus 300*b* in step S919. Steps S917 to S919 are repeatedly performed until printing is completed. Upon completion of printing, the process advances to step S806.

Steps S806 and S807 in which function use is terminated are the same as those of FIG. 8, and the portable information processing apparatus 300*b* and the MFP 100 return to the initial state. The MFP 100 detects that function use has been terminated, and transits from the power transmission stage S704 to the selection stage S701, thereby interrupting the power transmission function. After that, the MFP 100 operates Power Signal to transit to the confirmation stage S702.

Upon detecting that function use has been terminated, in step S920 the MFP 100 discards the function use request source identifier generated in step S906. This is done to prevent the function use request source identifier from being unnecessarily reused.

In step S921, the portable information processing apparatus 300*b* which has preferentially received power refrains from issuing a power reception request without notifying the MFP 100 of a Signal Strength packet (prohibits a power request from being transmitted) until a predetermined time elapses. This is done to resume power reception when the portable information processing apparatus 300*a* which previously received power from the MFP 100 desires to continuously receive power. Note that the predetermined time may be a fixed time in the portable information processing apparatus 300*b*, or a time designated by the MFP 100 for the portable information processing apparatus 300*b* in step S907 or S909.

Steps S922 to S925 are the same as steps S901 to S904, respectively. The portable information processing apparatus 300*a* can receive power again from the MFP 100.

It is, therefore, possible to preferentially transmit power to the apparatus which performs NFC communication. In the above example, for example, the portable information processing apparatus 300*b* which requests the use of the printing function of the MFP 100 can receive power from the MFP 100 during print processing of its own even while the MFP 100 is charging another apparatus. This enables the portable information processing apparatus 300*b* to avoid a risk that the battery runs out during the print processing.

The portable information processing apparatus 300*a* can receive power from the MFP 100 before and after the portable information processing apparatus 300*b* performs NFC communication with the MFP 100. It is, therefore, possible to preferentially transmit power to an apparatus which performs NFC communication while appropriately transmitting power to an apparatus which does not perform NFC communication. For example, the processing in step S921 enables the portable information processing apparatus 300*a* to resume power reception from the MFP 100 without any special mechanism after completion of printing of the portable information processing apparatus 300*b*.

Note that the MFP 100 interrupts power transmission at the time of step S909 in this embodiment. However, the timing of interrupting power transmission is not limited to this. For example, the MFP 100 may interrupt power transmission at the time of step S906 or S907. In this embodiment, until the portable information processing apparatus 300*b* starts printing, the portable information processing apparatus 300*a* can receive power. In this case, however, power reception by the portable information processing apparatus 300*a* is interrupted earlier. Therefore, care must be taken for that.

Furthermore, various improvements can be made without departing from the spirit and scope of the present invention, as a matter of course. For example, the apparatus may be notified of the period of validity of the function use request source identifier in step S907 by further providing a mechanism of managing the period of validity of the function use request source identifier.

FIG. 10 shows a sequence when data transfer is performed by switching between NFC and WLAN.

Since the communication rate of NFC is relatively as low as several hundred bps, authentication or the like is executed by NFC, and a large amount of data is transferred using a faster WLAN, thus attaining efficient data transfer.

FIG. 10 shows an example of so-called PUSH type communication in which in order to print image data existing in a portable information processing apparatus 1001 using a printing apparatus 1002, the portable information processing apparatus 1001 serves as an initiator to transfer the print data.

In this example, the portable information processing apparatus 1001 corresponds to the portable information processing apparatus 300 of FIG. 3, and the printing apparatus 1002 corresponds to the MFP 100 of FIG. 1. An NFC communication portion 1003 and WLAN communication portion 1004 correspond to the NFC portion 318 and WLAN portion 317 of FIG. 3, respectively. Furthermore, an NFC communication portion 1005 and WLAN communication 1006 correspond to the NFC portion 118 and WLAN portion 117 of FIG. 1, respectively.

In step S1001, to establish NFC communication, the NFC communication portion 1003 serves as an initiator to detect the NFC communication portion 1005 as a target.

When the NFC communication portion 1005 is normally detected, it transmits a detection response in step S1002. Note that the example shown in FIG. 10 indicates a case in which the portable information processing apparatus 1001 serves as an initiator. However, in practice, the printing apparatus 1002 may serve as an initiator based on an input from the operation and display portion 205.

Upon normally receiving the detection response, in step S1003 the NFC communication portion 1003 transmits an attribute request for performing NFC communication.

Upon receiving the attribute request, the NFC communication portion 1005 transmits an attribute response in step S1004. Note that the NFC IDs of the initiator and target are transmitted at the time of transmitting the attribute request and the attribute response, respectively, thereby specifying a communication partner based on these IDs.

In step S1005, mutual authentication is executed between the NFC communication portions 1003 and 1005, and an encryption key or the like for data encryption can be transferred. Note that if it is not necessary to transfer an encryption key, mutual authentication need not be performed.

In step S1006, the NFC communication portion 1003 requests, of the NFC communication portion 1005, information of a communication protocol usable by the printing apparatus 1002. This request includes information of a communication protocol usable by the portable information processing apparatus 1001. Therefore, upon receiving this request, the NFC communication portion 1005 can recognize that WLAN communication of the portable information processing apparatus 1001 is usable.

In step S1007, the NFC communication portion 1005 returns information of a communication protocol usable by itself as a response to the received request. This enables both the apparatuses to recognize the usable communication protocol of one another.

Assume that WLAN as a recognized protocol other than NFC can attain faster data transfer than NFC, and the portable information processing apparatus 1001 serving as an initiator decides to perform communication by switching (handing over) the protocol to WLAN. Note that the printing apparatus 1002 may decide to switch the protocol. In this case, in steps S1008 and S1009, for example, information such as an address which is used to specify a communication partner and required to perform WLAN communication is exchanged.

In step S1010, the NFC communication portion 1003 transmits a request to switch from NFC communication to WLAN communication.

Upon receiving the switching request, the NFC communication portion 1005 returns a switching response in step S1011.

When the NFC communication portion 1003 receives the switching response, it is switched to the WLAN communication portion 1004 in step S1012.

When the NFC communication portion 1005 transmits a switching response, it is switched to the WLAN communication portion 1006 in step S1013.

After the switching, the NFC communication portion 1003 transmits a release request in step S1014.

Upon receiving the release request, the NFC communication portion 1005 transmits a release response in step S1015, thereby terminating NFC communication.

In step S1016 and subsequent steps, WLAN communication is performed based on the pieces of information for WLAN communication which have been exchanged in steps S1008 and S1009.

In step S1016, the WLAN communication portion 1004 transmits a confirmation request to confirm, with the WLAN communication portion 1006, whether data transfer is possible. In this case, contents to be confirmed include, for example, a free space required to temporarily save an image to be transferred to the printing apparatus 1002.

Upon receiving the confirmation request, the WLAN communication portion 1006 transmits a confirmation response to the confirmation request in step S1017.

When the WLAN communication portion 1004 receives the confirmation response, and determines that data transfer is possible, it transmits image data existing in the portable information processing apparatus 1001 to the WLAN communication portion 1006 in step S1018. This allows a large amount of data to be transferred using a faster communication protocol.

Figure 11:
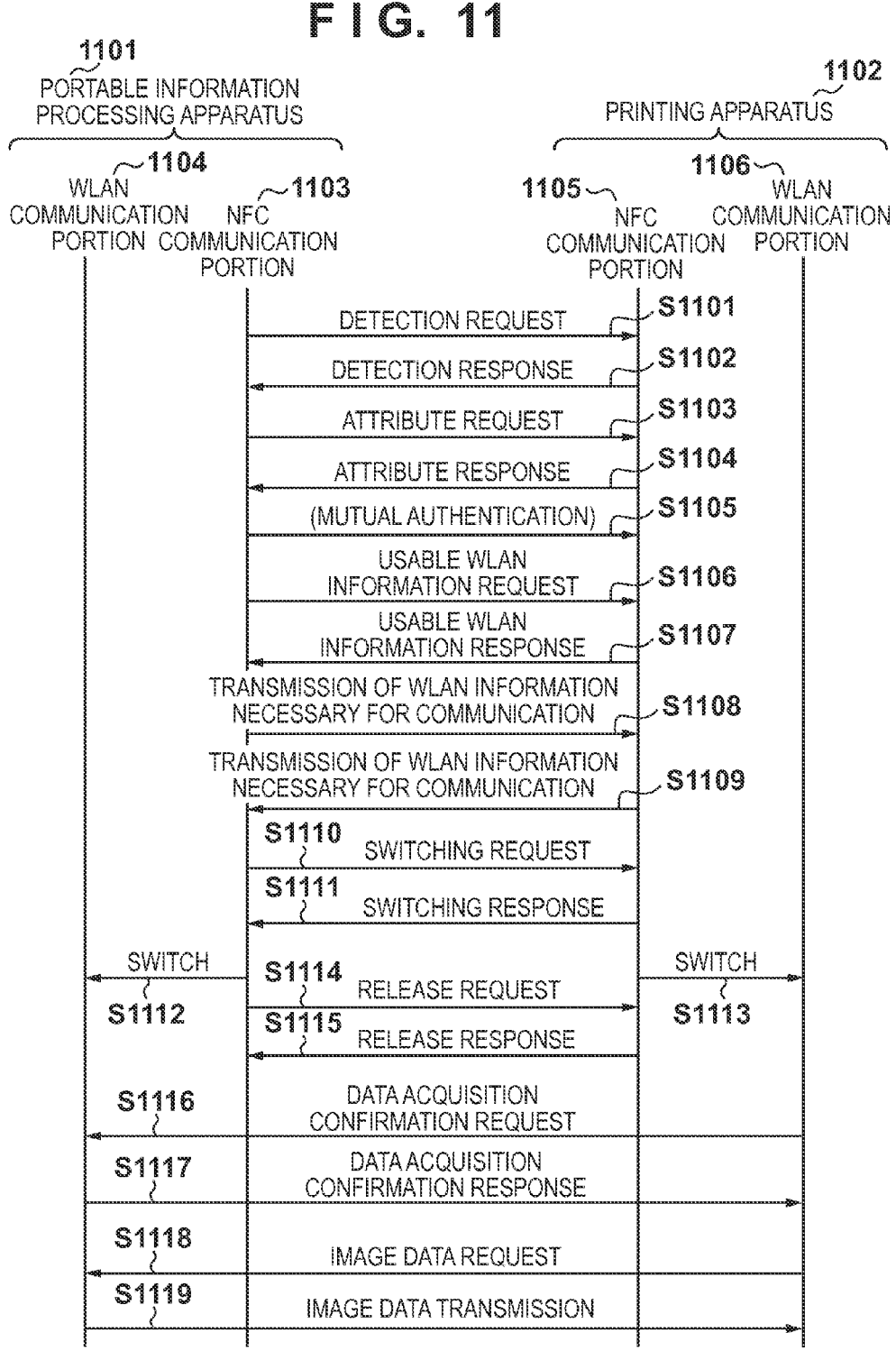
FIG. 11 is a sequence chart showing a sequence when data transfer is performed by switching between NFC and WLAN.

FIG. 11 shows a sequence when data transfer is performed by switching between NFC and WLAN.

FIG. 11 shows an example of so-called PULL type communication in which in order to print image data existing in a portable information processing apparatus 1101 using a printing apparatus 1102, the printing apparatus 1102 serves as an initiator to transfer the image data.

Note that the portable information processing apparatus 1101, a WLAN communication portion 1104, and an NFC communication portion 1103 correspond to the portable information processing apparatus 1001, WLAN communication portion 1004, and NFC communication portion 1003 of FIG. 10, respectively. The printing apparatus 1102, a WLAN communication portion 1106, and an NFC communication portion 1105 correspond to the printing apparatus 1002, WLAN communication portion 1006, and NFC communication portion 1005 of FIG. 10, respectively. In addition, steps S1101 to S1115 correspond to steps S1001 to S1015 of FIG. 10, respectively, and a detailed description thereof will be omitted.

After communication is switched from that based on the NFC standard to WLAN communication, the WLAN communication portion 1106 transmits a data acquisition confirmation request to the WLAN communication portion 1104 in step S1116. In this case, contents to be confirmed include, for example, a data size planned to be transferred by the portable information processing apparatus 1101.

Upon receiving the data acquisition confirmation request associated with transfer data, the WLAN communication portion 1104 transmits a confirmation response in step S1117.

When the WLAN communication portion 1106 receives the confirmation response, and determines that data transfer is possible in consideration of a free space of the printing apparatus 1102 and the like, it requests image data in step S1118.

Upon receiving the image data request, the WLAN communication portion 1104 transmits the requested image data in step S1119.

Figure 12:
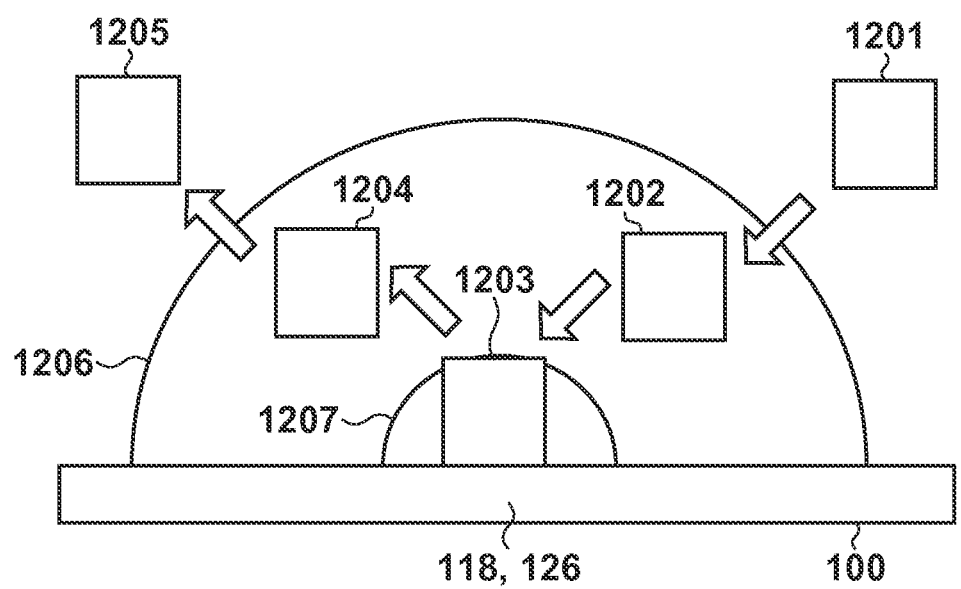
FIG. 12 is a schematic view showing billing and charging in the MFP and portable information processing apparatuses.

FIG. 12 is schematic view showing billing and charging in the portable information processing apparatus and the MFP.

Referring to FIG. 12, reference numerals 1201 to 1205 denote portable information processing apparatuses. The portable information processing apparatuses are shown to indicate a difference in position. Reference numeral 1206 denotes an NFC communicable area. This area is an area where the NFC portion 118 can perform communication, and is influenced by radio waves. Reference numeral 1207 denotes a wireless power suppliable area. This area indicates a range within which the Qi power transmission portion 126 supplies power for charging. In this embodiment, as shown in FIG. 12, the NFC communicable area 1206 of the NFC portion 118 is set wider than the wireless power suppliable area 1207 of the Qi power transmission portion 126.

The portable information processing apparatuses 1201 and 1205 are included in an area where NFC communication and wireless power supply are impossible. The portable information processing apparatuses 1202 and 1204 are included in an area where NFC communication is possible but wireless power supply is impossible. The portable information processing apparatus 1203 is included in an area where NFC communication and wireless power supply are possible. The difference between the portable information processing apparatuses 1201 and 1202 and the portable information processing apparatuses 1204 and 1205 indicates whether the apparatus has moved close to the portable information processing apparatus 1203 to perform charging.

As described above, the MFP 100 can determine the state of the position of the portable information processing apparatus with respect to the NFC communicable area 1206 of the NFC portion 118 and the wireless power suppliable area 1207 of the Qi power transmission portion 126.

Figure 13B:
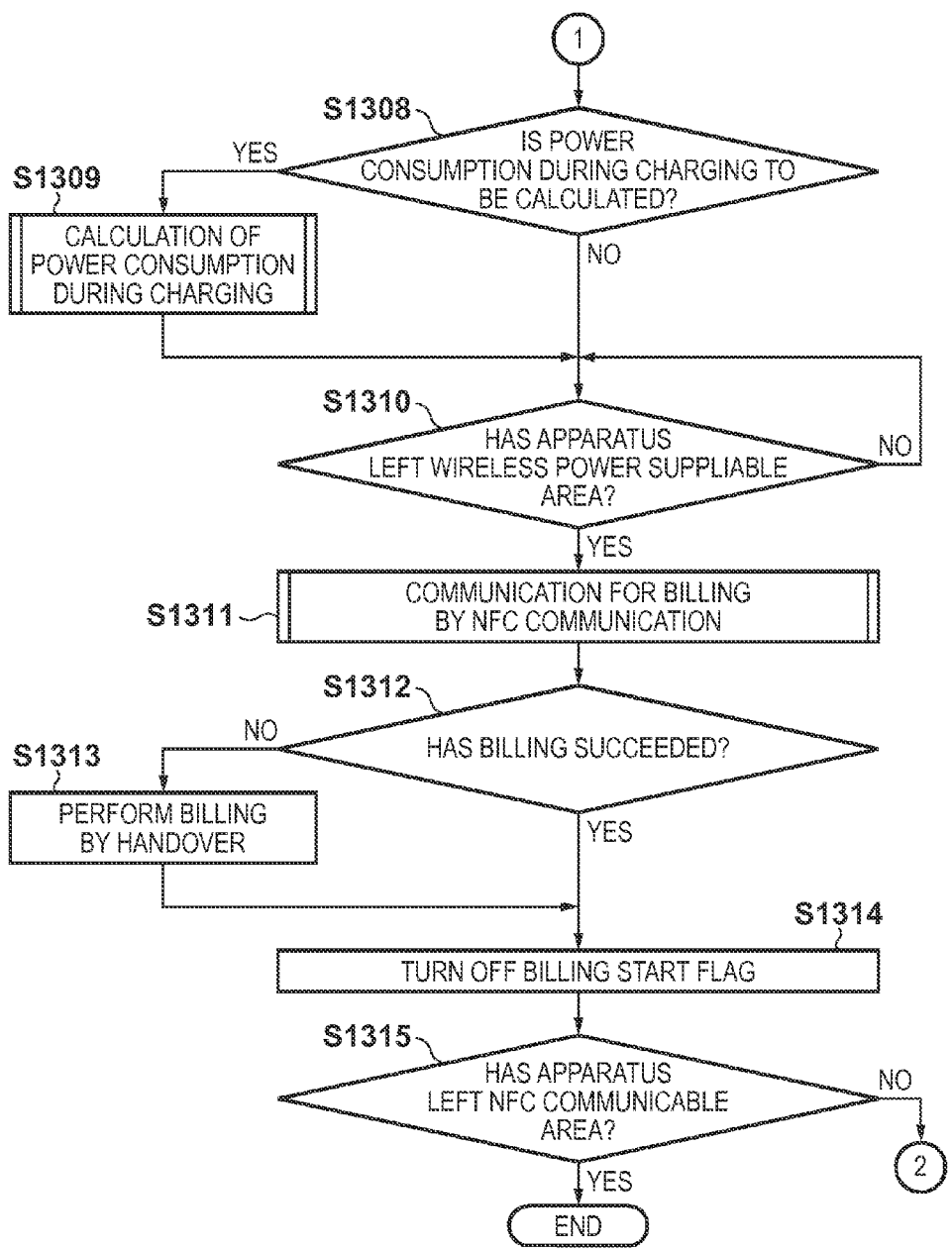
FIG. 13B is a flowchart illustrating billing processing executed by the MFP for charging of the portable information processing apparatus.

FIGS. 13A and 13B are a flowchart illustrating billing processing executed by the MFP 100 for charging of the portable information processing apparatus 300.

According to this flowchart, the MFP 100 can perform billing for charging of the portable information processing apparatus 300.

Note that the processing shown in FIGS. 13A and 13B are executed by the CPU 102 of the MFP 100. More specifically, the ROM 103 of the MFP 100 stores a program for implementing the processing shown in FIGS. 13A and 13B. When the CPU 102 executes the program on the RAM 104, the processing shown in FIGS. 13A and 13B can be implemented.

In step S1301, the MFP 100 determines whether the portable information processing apparatus 300 has entered the NFC communicable area, and established communication. That is, the MFP 100 determines whether the portable information processing apparatus 300 has transited from the state of the portable information processing apparatus 1201 to that of the portable information processing apparatus 1202 in FIG. 12.

If the MFP 100 determines that communication has not been established (NO in step S1301), it stands by until communication is established; otherwise (YES in step S1301), the MFP 100 determines in step S1302 whether the portable information processing apparatus 300 has entered the wireless power suppliable area to start billing. That is, the MFP 100 determines whether the portable information processing apparatus 300 has transited from the state of the portable information processing apparatus 1202 to that of the portable information processing apparatus 1203 in FIG. 12.

If the MFP 100 determines that the portable information processing apparatus 300 has not entered the wireless power suppliable area (NO in step S1302), it stands by until the portable information processing apparatus 300 enters the wireless power suppliable area. Note that in the state in which the MFP 100 stands by until the portable information processing apparatus 300 enters the wireless power suppliable area, NFC communication may be performed. During or after NFC communication, the MFP 100 may determine whether the portable information processing apparatus 300 has entered the wireless power suppliable area.

On the other hand, if the MFP 100 determines that the portable information processing apparatus 300 has entered the wireless power suppliable area (YES in step S1302), it turns on a billing start flag in step S1303. The billing start flag indicates whether to perform billing for charging. If the flag is ON, billing is performed; otherwise, no billing is performed. The state (ON/OFF) of the billing start flag is managed on, for example, the RAM 104.

Note that in step S1303, the MFP 100 acquires the current amount of charge of the portable information processing apparatus 300, and manages it on the RAM 104. The amount of charge is a value used for billing calculation performed at the time of billing. If the MFP 100 determines in step S1302 that the portable information processing apparatus 300 has entered the wireless power suppliable area, the Qi power transmission portion 126 supplies power to the information processing apparatus.

In step S1304, the MFP 100 acquires handover information from the portable information processing apparatus 300. In step S1305, the MFP 100 determines whether acquisition of handover information is impossible. If the MFP 100 determines that acquisition of handover information is possible (NO in step S1305), the process advances to step S1307. On the other hand, if the MFP 100 determines that acquisition of handover information is impossible (YES in step S1305), the MFP 100 lowers the amount of power on the power supply side (Qi power transmission portion 126) of wireless power supply in step S1306. If acquisition of handover information is impossible, when NFC communication fails, billing cannot be performed by another method. Therefore, it is important to appropriately complete billing within the NFC communicable area. As will be described later, in this embodiment, billing is performed when the portable information processing apparatus 300 exists within the NFC communicable area after leaving the wireless power suppliable area. To do this, in step S1306, the wireless power suppliable area is intentionally narrowed to make NFC communication for billing succeed, and a sufficient area (outside the wireless power suppliable area and within the NFC communicable area) for billing is ensured, thereby preventing NFC communication from failing.

Note that the handover indicates that information necessary for the second short distance wireless communication method of a communication target apparatus is transmitted and received by the first short distance wireless communication with low power consumption, and high-speed communication is performed by the second short distance wireless communication method using the information. The first short distance wireless communication method is, for example, NFC, and the second short distance wireless communication method is, for example, Bluetooth® or wireless LAN. The handover information is communication setting information necessary for performing a handover.

In step S1307, the MFP 100 acquires the charging efficiency from the portable information processing apparatus 300. This processing is an operation of acquiring the status of currently executed charging from the portable information processing apparatus 300. Based on the charging efficiency, the MFP 100 can determine whether charging is being satisfactorily performed.

In step S1308, the MFP 100 determines whether to calculate the power consumption during charging. Note that the MFP 100 can calculate the power consumption based on the charging efficiency acquired in step S1307. This determination of whether to calculate the power consumption is performed according to whether to perform billing for power used by the portable information processing apparatus 300 during charging. In this embodiment, this determination is performed based on a setting value. However, the determination method is not limited to this.

If the MFP 100 determines not to calculate the power consumption (NO in step S1308), the process advances to step S1310. On the other hand, if the MFP 100 determines to calculate the power consumption (YES in step S1308), it calculates the power consumption of the portable information processing apparatus 300 during charging in step S1309. Details of this processing will be described later with reference to FIG. 16.

Figure 17:
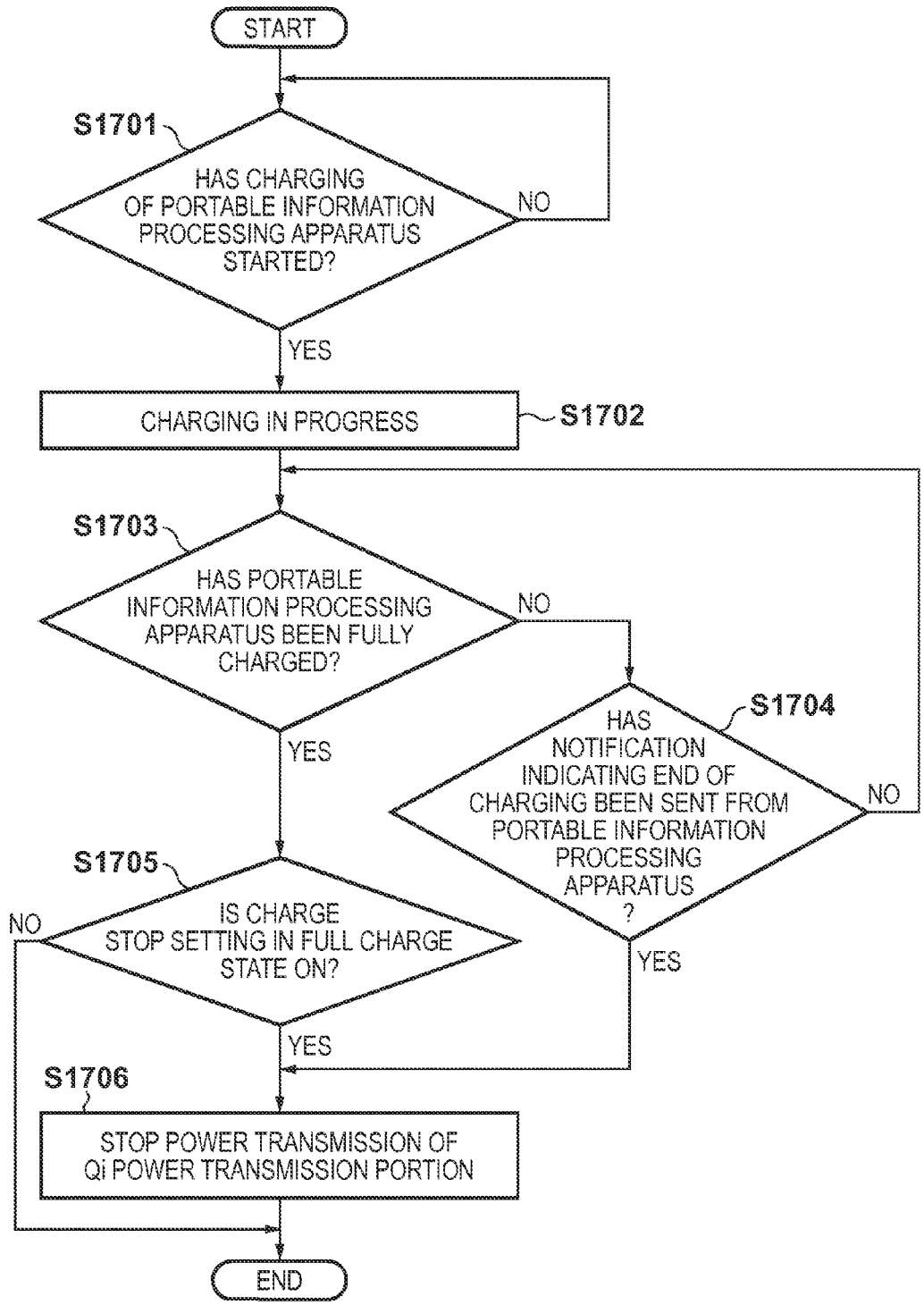
FIG. 17 is a flowchart illustrating processing when the amount of charge of the portable information processing apparatus is in a full charge state.

In step S1310, the MFP 100 determines whether the portable information processing apparatus 300 has left the wireless power suppliable area. That is, the MFP 100 determines whether the portable information processing apparatus 300 has transited from the state of the portable information processing apparatus 1203 to that of the portable information processing apparatus 1204 in FIG. 12. More specifically, if the NFC communication session established in step S1301 is disconnected, the MFP 100 can determine that the portable information processing apparatus 300 has transited from the state of the portable information processing apparatus 1203 to that of the portable information processing apparatus 1204 in FIG. 12, under the condition of the disconnection. Note that it is also possible to produce the same situation by stopping wireless power supply even in the state of the portable information processing apparatus 1203, as shown in FIG. 17. In this example, the determination processing is performed by including such situation.

If the MFP 100 determines that the portable information processing apparatus 300 has not left the wireless power suppliable area (NO in step S1310), it stands by until the portable information processing apparatus 300 leaves the wireless power suppliable area. On the other hand, if the MFP 100 determines that the portable information processing apparatus 300 has left the wireless power suppliable area (YES in step S1310), it performs communication for billing using NFC communication in step S1311. Details of this processing will be described later with reference to FIG. 14.

In step S1312, the MFP 100 determines whether billing has succeeded. If the MFP 100 determines that billing has not succeeded (NO in step S1312), it performs billing by a handover in step S1313. If the MFP 100 performs billing by a handover, it performs billing using the handover information acquired in step S1304. The process then advances to step S1314.

On the other hand, if the MFP 100 determines that billing has succeeded (YES in step S1312), it turns off the billing start flag in step S1314. In step S1315, the MFP 100 determines whether the portable information processing apparatus 300 has left NFC communicable area. If the MFP 100 determines that the portable information processing apparatus 300 has not left the NFC communicable area (NO in step S1315), the process returns to step S1302. On the other hand, the MFP 100 determines that the portable information processing apparatus 300 has left the NFC communicable area (YES in step S1315), the process ends.

With the above processing, under the condition that the portable information processing apparatus 300 has left the wireless power suppliable area, the MFP 100 determines the end of power supply to the portable information processing apparatus 300. After the end of power supply, the MFP 100 performs billing processing. That is, it is possible to perform billing processing using wireless short distance communication according to the amount of charge after charging.

Note that in the above description of FIGS. 13A and 13B, when the portable information processing apparatus 300 exists outside the wireless power suppliable area and within the NFC communicable area, whether billing has succeeded is determined. The present invention, however, is not limited to this, and whether billing has succeeded may be determined when the portable information processing apparatus 300 leaves the NFC communicable area. If billing has not succeeded, billing processing may be performed by a handover.

Figure 14:
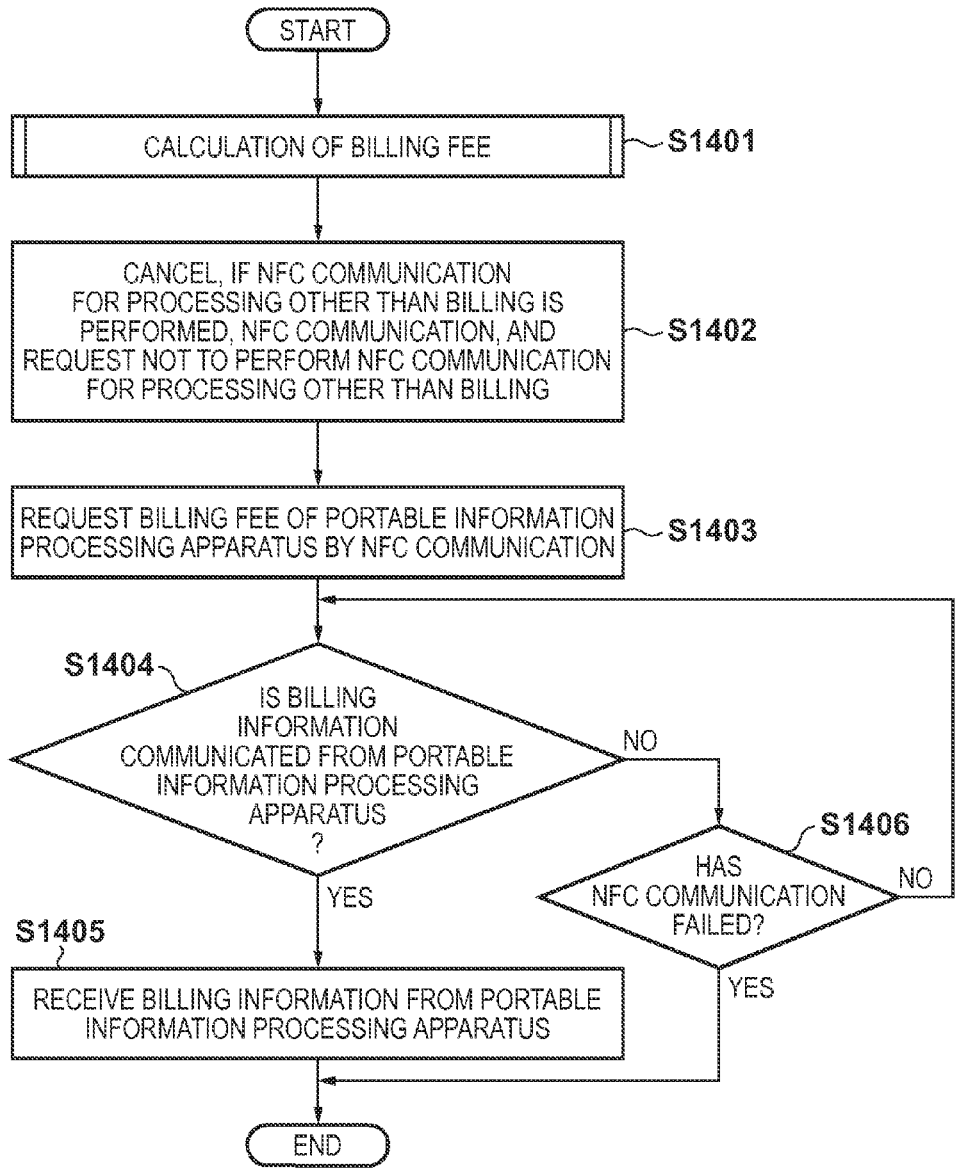
FIG. 14 is a flowchart illustrating details of step S1311 of FIG. 13B.

FIG. 14 is a flowchart illustrating details of step S1311 of FIG. 13B. That is, FIG. 14 shows details of the billing processing performed by the MFP 100 using NFC communication.

In step S1401, the MFP 100 calculates a billing fee. Details of this processing will be described later with reference to FIG. 15. It is possible to bill not only the amount of charged power but also other fees. In step S1402, if NFC communication for processing such as printing other than billing is currently performed, the MFP 100 cancels the NFC communication to switch the communication to communication for billing. The MFP 100 also requests the portable information processing apparatus 300 not to perform NFC communication for processing other than billing. This processing is performed to prioritize the subsequent billing processing so as to quickly succeed.

In step S1403, the MFP 100 requests billing information including the billing fee of the portable information processing apparatus 300 by NFC communication. In step S1404, the MFP 100 determines whether the portable information processing apparatus 300 communicates the billing information. If the MFP 100 determines that the billing information is communicated (YES in step S1404), it receives the billing information from the portable information processing apparatus 300 in step S1405, thereby terminating the process.

On the other hand, if the MFP 100 determines that the billing information is not communicated (NO in step S1404), it determines in step S1406 whether NFC communication has failed. If the MFP 100 determines that NFC communication has failed (YES in step S1406), the process ends; otherwise (NO in step S1406), the process returns to step S1404, and the MFP 100 stands by again for the end of communication.

Figure 15:
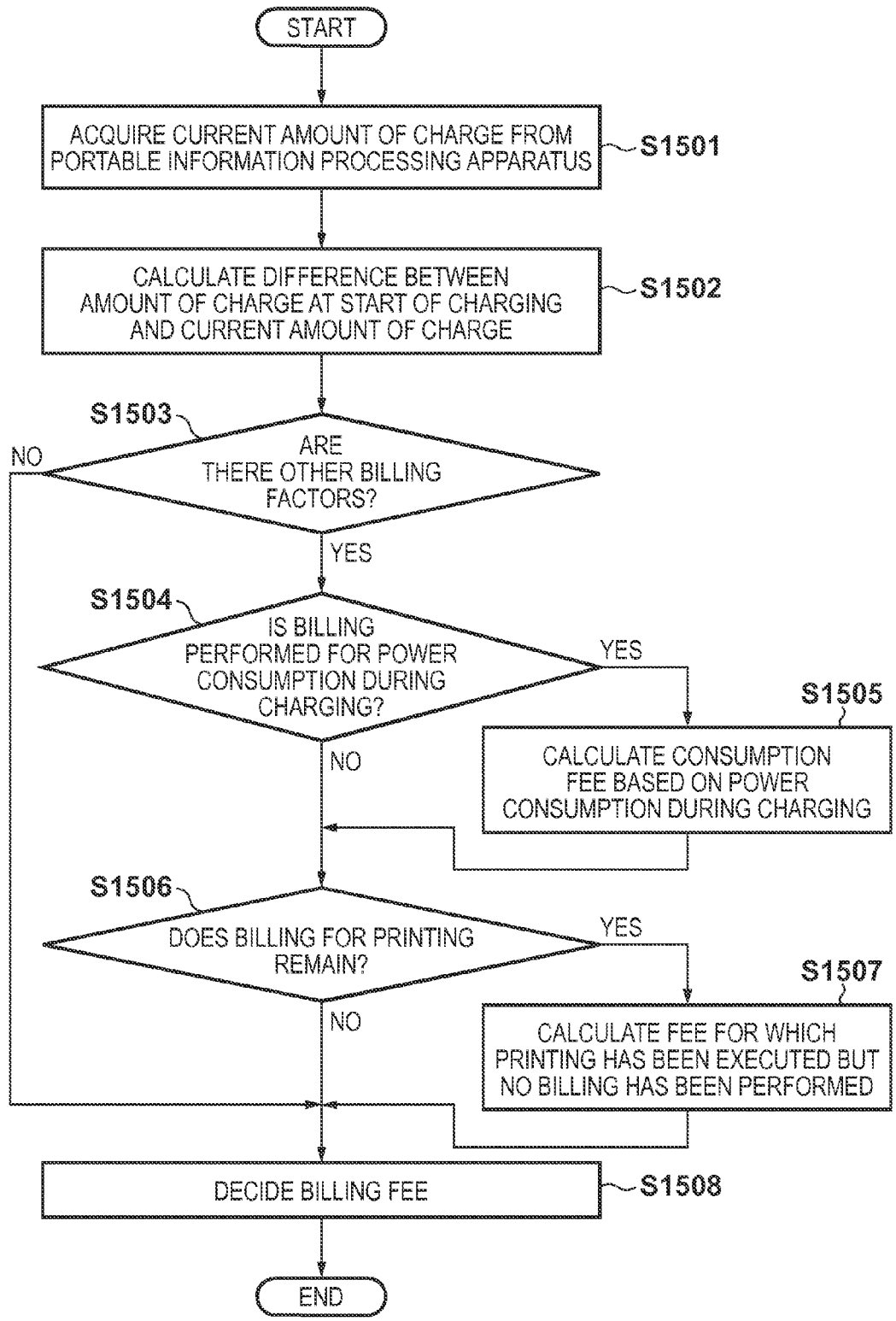
FIG. 15 is a flowchart illustrating details of step S1401 of FIG. 14.

FIG. 15 is a flowchart illustrating details of step S1401 of FIG. 14. That is, FIG. 15 shows details of calculation of a billing fee by the MFP 100. In this embodiment, it is possible to calculate, as a billing target, not only the billing fee of charging but also a print fee and the fee of power used during charging.

In step S1501, the MFP 100 acquires the current amount of charge from the portable information processing apparatus 300. In step S1502, the MFP 100 calculates the difference between the amount of charge at the start of charging and the current amount of charge. In step S1503, the MFP 100 determines whether there are other billing factors. In this embodiment, the other billing factors include the amount of charge, an amount for compensating for the amount of power consumed during charging, and a billing fee for which printing has been executed but no billing has been performed. If the MFP 100 determines that there are no such billing factors (NO in step S1503), the process advances to step S1508, and the MFP 100 decides a billing fee, thereby terminating the process.

On the other hand, if the MFP 100 determines that there are billing factors (YES in step S1503), the process advances to step S1504, and the MFP 100 determines whether to perform billing for the power consumption during charging. If the MFP 100 determines that no billing is performed for the power consumption (NO in step S1504), the process advances to step S1506; otherwise (YES in step S1504), the process advances to step S1505, and the MFP 100 calculates a consumption fee based on the power consumption during charging (power supply). Details of this processing will be described later with reference to FIG. 16. The power consumption is calculated by calculating the consumption rate and the time taken for charging using a value obtained by calculating the amount of power consumed by the portable information processing apparatus during charging, thereby calculating a billing fee for the amount of power based on the power consumption. If, for example, the portable information processing apparatus 300 performs processing which uses large power during charging, it is impossible to recognize the amount of charge by checking the difference in amount of charge between the start and end of charging. It is, however, possible to calculate the consumed amount by executing the processing shown in FIG. 16, thereby billing the consumption fee together.

In step S1506, the MFP 100 determines whether billing for printing remains (whether a function for which billing is to be performed has been used). In this embodiment, it is possible to issue a printing instruction during charging. In this processing, billing is performed for information for which printing has been executed but no billing has been performed in such case. If no billing for printing remains (NO in step S1506), the process advances to step S1508; otherwise (YES in step S1506), the process advances to step S1507, and the MFP 100 calculates a fee for which printing has been executed but no billing has been performed. In step S1508, the MFP 100 decides the total billing fee. The fee may be the billing fee calculated in step S1502, or may be obtained by adding the fees calculated in steps S1505 and S1507. In this way, the billing fee is decided.

Note that the processing in step S1506 is performed with respect to billing for printing. Billing may be performed for various functions (scanning and FAX functions and the like) providable by the MFP 100, as a matter of course.

Figure 16:
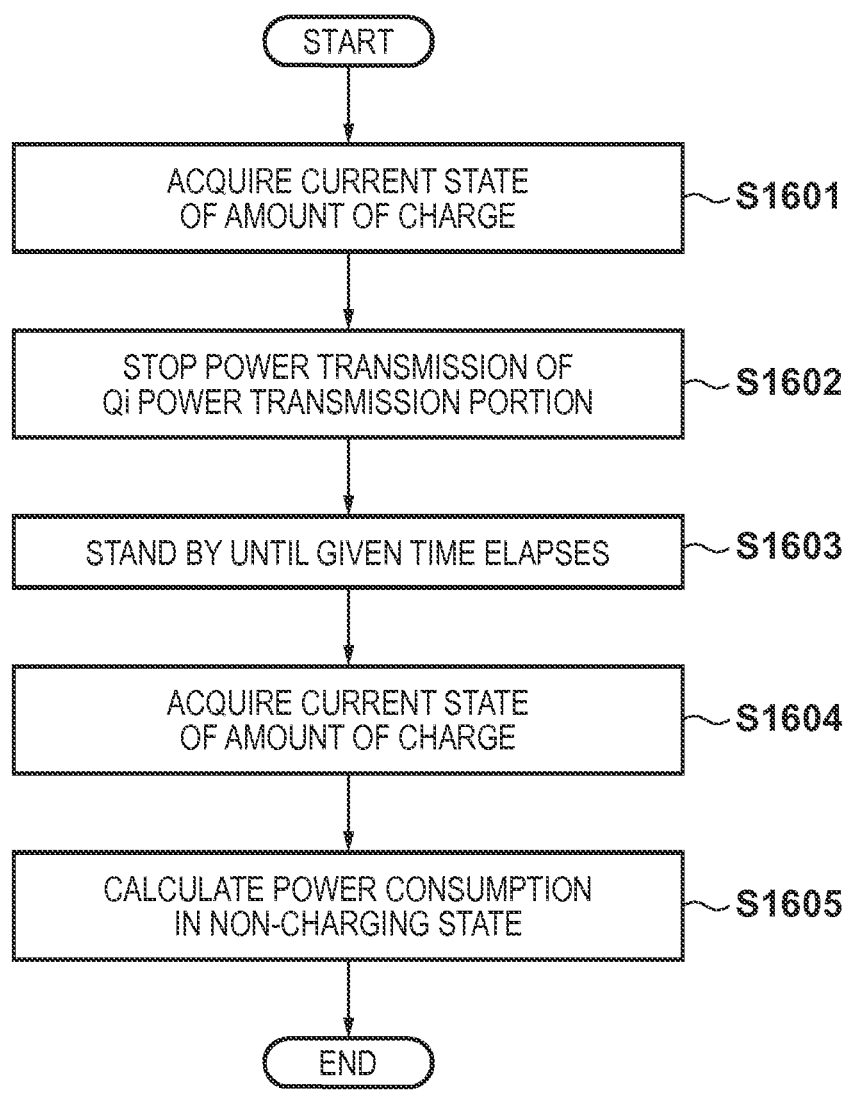
FIG. 16 is a flowchart illustrating details of step S1309 of FIG. 13B.

FIG. 16 is a flowchart illustrating details of step S1309 of FIG. 13B. That is, FIG. 16 shows details of calculation of the power consumption during charging.

In step S1601, the MFP 100 acquires the current state of the amount of charge of the portable information processing apparatus 300. In step S1602, the MFP 100 stops power transmission of the Qi power transmission portion 126. This temporarily stops power supply (charging) for a given time. In step S1603, the MFP 100 stands by until the given time elapses. In step S1604, the MFP 100 acquires the current state of the amount of charge again. This allows calculation of the power consumption of the portable information processing apparatus 300 in a non-charging state in steps S1602 to S1604. That is, it is possible to calculate the power consumption per unit time in the non-charging state based on the power consumptions (a decrease in amount of power) before and after the given time elapses.

In step S1605, the MFP 100 calculates the power consumption (power consumption ratio) of the portable information processing apparatus 300 per unit time in the non-charging state based on the charge amount states acquired in steps S1601 and S1604. The power consumption of the portable information processing apparatus 300 per unit time in the non-charging state, which has been calculated in step S1605, can be used to calculate a billing fee in step S1505 of FIG. 15.

Note that the processing in step S1309 (FIG. 16) may be executed at various timings. For example, the portable information processing apparatus 300 determines whether processing which consumes power has been performed. If the portable information processing apparatus 300 determines that such processing has been performed, it may notify the MFP 100 of it by NFC. Upon receiving the notification, the MFP 100 executes the processing in step S1309 (FIG. 16).

Alternatively, the portable information processing apparatus 300 may calculate the power consumption according to processing executed from the start of power supply until the portable information processing apparatus 300 leaves the wireless power suppliable area. When the portable information processing apparatus 300 leaves the wireless power suppliable area, it may notify the MFP 100 of the power consumption. In this case, since the portable information processing apparatus 300 can execute predetermined processing such as printing control while performing charging, it is possible to prevent the battery from running out during the processing.

FIG. 17 is a flowchart illustrating processing when the amount of charge of the portable information processing apparatus is in a full charge state. Note that the processing shown in FIG. 17 is executed during a period from when the portable information processing apparatus 300 enters the wireless power suppliable area in step S1302 of FIG. 13A until it leaves the wireless power suppliable area in step S1310.

In step S1701, the MFP 100 determines whether charging of the portable information processing apparatus 300 has started. If the MFP 100 determines that charging has not started (NO in step S1701), it stands by until charging starts; otherwise (YES in step S1701), the process advances to step S1702, and the MFP 100 confirms that charging is in progress.

In step S1703, the MFP 100 determines whether the battery of the portable information processing apparatus 300 has been fully charged. If the MFP 100 determines that the battery has not been fully charged (NO in step S1703), the process advances to step S1704, and the MFP 100 determines the presence/absence of a notification indicating the end of charging from the portable information processing apparatus 300. This notification is sent from the portable information processing apparatus 300 to the MFP 100 when, for example, the user issues an instruction on the screen of the portable information processing apparatus 300. If the MFP 100 determines that a notification indicating the end of charging has been sent, (YES in step S1704), the process advances to step S1706, and the MFP 100 stops power transmission of the Qi power transmission portion 126.

On the other hand, if the MFP 100 determines that no notification indicating the end of charging has been sent (NO in step S1704), the process returns to step S1703. If the MFP 100 determines that the battery has been fully charged (YES in step S1703), the MFP 100 determines in step S1705 whether a charge stop setting in the full charge state is ON. If the MFP 100 determines that the setting is not ON (NO in step S1703), the process ends; otherwise (YES in step S1703), the process advances to step S1706, and the MFP 100 stops power transmission of the Qi power transmission portion 126.

If power transmission of the Qi power transmission portion has stopped in the processing in step S1706, billing is performed according to the difference between the remaining battery amount at the start of charging and that in the full charge state in the processes in steps S1501 and S1502 of FIG. 15. If the portable information processing apparatus 300 consumes power after the battery is fully charged, power transmission by the Qi power transmission portion may start again. In this case, appropriate billing can be performed by executing billing processing for the power consumption during charging.

Note that the reason why the processing in step S1705 is prepared is as follows. That is, when the power of the portable information processing apparatus 300 is ON, the portable information processing apparatus 300 uses power during charging. As shown in the processing of FIG. 17, if billing is performed for all power used, when charging is continuously performed, billing is endlessly performed. This may result in billing against the user's intention. By allowing selection of whether to terminate charging by performing billing for charging when the battery is fully charged, it is possible to prevent unintended billing. Note that the charge stop setting (stop setting information) can be set by notifying the MFP 100 of it by the portable information processing apparatus 300 but may be set in the MFP 100.

If power transmission by the Qi power transmission portion is stopped in step S1706, even if the MFP 100 does not determine in step S1310 of FIG. 13B that the portable information processing apparatus 300 has left the wireless power suppliable area, the billing processing in step S1311 may be executed. This makes it possible to perform billing processing without moving the portable information processing apparatus by the user, thereby allowing billing processing with enough time and space.

As described above, according to this embodiment, when the portable information processing apparatus transits from the state in which the apparatus exists within the NFC communicable area and within wireless power suppliable area to the state in which the apparatus exists outside the wireless power suppliable area and within the NFC communicable area, the MFP determines completion of power supply, and performs billing for the amount of charge until now (generates billing information).

Note that if billing is performed for charging by wireless power supply according to the time or the amount of power, the charging efficiency changes depending on the position of the portable information processing apparatus, and thus the accuracy of billing performed in advance is low. In this embodiment, it is possible to perform billing according to the amount of charge of the user by performing billing later for the amount used.

Note that a case in which power supply starts under the condition that the portable information processing apparatus enters the wireless power suppliable area has been explained in the aforementioned embodiment. The present invention, however, is not limited to this. For example, when billing is performed using electronic money, power supply may start under the condition of the balance of the electronic money. More specifically, in the state of the portable information processing apparatus 1202 shown in FIG. 12, the MFP 100 acquires the balance of the electronic money of the portable information processing apparatus by NFC. If the balance is lower than a minimum fee for power supply, the Qi power transmission portion may be stopped. In this case, the Qi power transmission portion may be set ON in the normal state. When the condition for power transmission is not satisfied, the Qi power transmission portion may be turned off. To the contrary, the Qi power transmission portion may be set OFF in the normal state. When the condition for power transmission is satisfied, the Qi power transmission portion may be turned on.

A case in which power transmission is stopped under the condition that the portable information processing apparatus is fully charged or the portable information processing apparatus sends a notification has been described with reference to FIG. 17. The present invention, however, is not limited to this. When an amount of charge corresponding to the balance of the electronic money acquired by the MFP 100 from the portable information processing apparatus before the start of power transmission is charged, power transmission may be stopped. In this case, billing may be performed under the condition that the portable information processing apparatus leaves the wireless power suppliable area, or before the apparatus leaves the area. Furthermore, the MFP 100 may notify the portable information processing apparatus by NFC that charging has been stopped because the balance is insufficient.

Note that in the above embodiment, NFC has been exemplified as a wireless communication method and Qi has been exemplified as a wireless power supply method. The present invention, however, is not limited to them, and various wireless communication methods such as Bluetooth and various wireless power supply methods other than Qi can be adopted.

Note that as described above, the NFC portion serving as a target in the passive mode can transmit and receive data by NFC even if no power is supplied from the AC power supply or battery. Therefore, for example, even if the power of a device (for example, a smartphone) to be charged is OFF, appropriate billing processing can be performed.

Note that billing processing is performed based on the amount of charge of the portable information processing apparatus in the above embodiment. The present invention, however, is not limited to this. For example, a billing fee may be calculated based on the charging time. Furthermore, for example, the power supply efficiency may be determined at the start of power supply, and the amount of charge may be determined by referring to the power supply efficiency and power supply time.

Note that a case in which the MFP 100 includes the NFC portion 118 and Qi power transmission portion 126 has been described in the above embodiment. The present invention, however, is not limited to this. For example, when an external NFC portion and Qi power transmission portion are attached to the MFP 100, the MFP 100 may serve as a control apparatus to control the two portions, thereby implementing NFC communication and wireless power supply.

In the above embodiment, a range within which billing is performed is defined as an area outside the wireless power suppliable area and within the wireless communicable area. However, the present invention is not limited to a case in which the apparatus exists outside the wireless power suppliable area. When, for example, the apparatus exists outside a predetermined partial range within the wireless communicable area, billing may be performed. If the predetermined partial range is included in the wireless power suppliable area, charging is performed in an area where billing is performed. In wireless power supply such as Qi, however, as the distance is longer, the power supply efficiency decreases. Even if the predetermined partial range is included in the wireless power suppliable area, it is possible to perform appropriate billing by setting the predetermined partial range to be wide enough.

Note that, for example, the distance between the portable information processing apparatus and the communication portion or power transmission portion can be determined based on the strength of an electromagnetic wave in NFC communication or wireless power supply, thereby determining, based on the distance, whether the portable information processing apparatus exists within the predetermined partial range.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-159716, filed Jul. 31, 2013, which is hereby incorporated by reference herein in its entirety.

What is claimed is:

1. A system comprising:
   a power supply apparatus configured to:
      wirelessly supply power to a power receiving device only when the power receiving device is in a position within a first area of the power supply apparatus, and
      wirelessly communicate, via near-field communication (NFC), with the power receiving device when the power receiving device is in a position within a second area of the apparatus, wherein the second area is wider than the first area; and
   the power receiving device configured to:
      wirelessly receive power supplied from the power supplying apparatus; and
      via NFC, wirelessly communicate with the power supplying apparatus,
   wherein the power supplying apparatus is further configured to:
      wirelessly supply power to the power receiving device when the power receiving device is in a first state in which the position of the device is within the first area and the second area,
      determine whether the state has transited from the first state to a second state in which the position of the power receiving device is within the second area but outside of the first area, based on wireless communication with the power receiving device via the NFC, and
      communicate information to the power receiving device after the power receiving device has transited from the first state to the second state, wherein the information is based on the amount of power supplied by the power supplying apparatus in the first state, and
   wherein the power receiving device is further configured to:
      serve as an initiator of NFC to commence wireless communication with the power supplying apparatus via the NFC, and
      serve as a target in a passive mode of NFC to receive the information communicated by the power receiving device.

2. The system according to claim 1, wherein the power supplying apparatus performs the determination based on wireless communication about a power supply amount by the power supplying apparatus with the power receiving device.

3. The system according to claim 1, wherein the power supplying apparatus wirelessly supplies power to the power receiving device specified by a wireless communication session established with the power receiving device, and when the communication session is disconnected, the power supplying apparatus determines that the state has transited from the first state to the second state.

4. The system according to claim 1, wherein the power supplying apparatus further communicates the information with the power receiving device by using a full charge state of the power receiving device or a predetermined notification from the power receiving device as a condition under which the power supply ends.

5. The system according to claim 1, wherein if the power supplying apparatus cannot communicate the information with the power receiving device via the NFC, the power supplying apparatus communicates the information with the power receiving device via another communication method.

6. The system according to claim 5, wherein the power supplying apparatus acquires communication setting information for communicating with the other communication method via the NFC, and communicates the information with the power receiving device via the other communication method according to the communication setting information.

7. The system according to claim 6, wherein the power supplying apparatus acquires the communication setting information before the position of the power receiving device transits to the second state.

8. The system according to claim 6, wherein if the power supplying apparatus does not acquire the communication setting information by the processing, the power supplying apparatus controls a wireless power suppliable area of the power supply to be narrower than that when the communication setting information is acquired.

9. The system according to claim 1, wherein the power supplying apparatus communicates billing information based on the power supply.

10. The system according to claim 9, wherein the power supplying apparatus communicates, as the billing information, a billing fee for an amount of power based on an amount of charge of the power supplying device by the power supply and power consumption of the power supplying device during the power supply.

11. The system according to claim 9, wherein the power supplying apparatus transmits the billing information including billing for the use of a billing target function to a function provided by said power supplying apparatus.

12. The system according to claim 1, wherein in a case where the state transits from the first state to the second state, communication by the power supplying apparatus for another processing different from transmission of billing information, is canceled to switch the communication to transmission of the billing information.

13. The system according to claim 1, wherein if the power receiving device sends a charging end notification during the power supply, the power supplying apparatus stops the power supply to the power receiving device.

14. The system according to claim 13, wherein if it is determined that the charge state of the power receiving device is a full charge state, the power supplying apparatus stops the power supply according to stop setting information for instructing to stop the power supply.

15. The system according to claim 1, wherein the power supplying apparatus is a printer, and the power receiving device, serving as the initiator in the NFC, communicates with the power supplying apparatus for printing by the power supplying apparatus, via the NFC.

16. A method of supplying power in a system including an power supplying apparatus and a power receiving device, the method comprising the steps of:
the power supplying apparatus:
wirelessly supplying power to the power receiving device only when the power receiving device has entered a position within a first area of the power supply apparatus, and
enabling, via NFC, wireless communication with the power receiving device when the power receiving device is in a position within a second area of the apparatus, where the second area is wider than the first area;
executing wireless power supply to the power receiving device when the power receiving device is in a first state in which the position of the power receiving device is within the first area and the second area;
determining whether the state has transited form the first state to a second state in which the position of the power receiving device is within the second area but outside of the first area, based on wireless communication with the power receiving device via the NFC, and
communicating information to the power receiving device after the power receiving device has transited from the first state to a second state, wherein the information is based on the amount of power supplied by the power supplying apparatus in the first state
the power receiving device:
serving as an initiator in the NFC, initiating NFC to commence wireless communication with the power supplying apparatus via the NFC,
wirelessly receiving power supplied from the power supplying apparatus,
enabling, via NFC, the wireless communication with the power supplying apparatus,
serving as a target in a passive mode, receiving the information communicated by the power receiving device.

17. The method according to claim 16, wherein the power supplying apparatus is a printer, and the power receiving device, serving as the initiator in the NFC, communicates with the power supplying apparatus for printing by the power supplying apparatus, via the NFC.

18. A non-transitory computer-readable storage medium storing a program for controlling a power supplying apparatus to supply power to a power receiving device, the program comprising instructions for:
the power supplying apparatus to:
wirelessly supply power to the power receiving device only when the power receiving device has entered a position within a first area of the power supply apparatus, and
enable, via NFC, wireless communication with the power receiving device when the power receiving device is in a position within a second area of the apparatus, where the second area is wider than the first area;
execute wireless power supply to the power receiving device when the power receiving device is in a first state in which the position of the power receiving device is within the first area and the second area;
determine whether the state has transited form the first state to a second state in which the position of the power receiving device is within the second area but outside of the first area, based on wireless communication with the power receiving device via the NFC, and
communicate information to the power receiving device after the power receiving device has transited from the first state to a second state, wherein the information is based on the amount of power supplied by the power supplying apparatus in the first state;
and instructions for enabling the power receiving device to:
serve as an initiator in the NFC to commence wireless communication with the power supplying apparatus via the NFC,
wirelessly receive power supplied from the power supplying apparatus,
via NFC, wirelessly communicate with the power supplying apparatus, and
serve as a target in a passive mode to receive the information communicated by the power receiving device.

19. The non-transitory computer-readable storage medium according to claim 18, wherein the power supplying apparatus is a printer, and the power receiving device, serving as the initiator in the NFC, communicates with the power supplying apparatus for printing by the power supplying apparatus, via the NFC.

* * * * *